US012708574B2

(12) United States Patent
Feron et al.

(10) Patent No.: US 12,708,574 B2
(45) Date of Patent: Aug. 18, 2026

(54) ARTICULATED MOTOR SUPPORT FOR WHEELCHAIR

(71) Applicant: MOTION COMPOSITES INC., Saint-Roch-de-l'Achigan (CA)

(72) Inventors: Gabriel Feron, Mascouche (CA); Alexandre Bleau, Lachenaie (CA); Camille Guilbault, Ste-Mélanie (CA); Alec Stephani, Saint-Lambert (CA); Mikael Prous, Outremont (CA); Benjamin Palmer, Laval (CA); Alain Chevigny, Saint-Sauveur (CA); Pier Alexandre Ethier, Rawdon (CA)

(73) Assignee: MOTION COMPOSITES INC., Saint-Roch-de-l'Achigan (CA)

( * ) Notice: Subject to any disclaimer, the term of this patent is extended or adjusted under 35 U.S.C. 154(b) by 368 days.

(21) Appl. No.: 18/261,549

(22) PCT Filed: Jan. 14, 2022

(86) PCT No.: PCT/CA2022/050053

§ 371 (c)(1),
(2) Date: Jul. 14, 2023

(87) PCT Pub. No.: WO2022/150923

PCT Pub. Date: Jul. 21, 2022

(65) Prior Publication Data

US 2024/0074925 A1 Mar. 7, 2024

Related U.S. Application Data

(60) Provisional application No. 63/137,798, filed on Jan. 15, 2021.

(51) Int. Cl.

| | |
|---|---|
| ***A61G 5/04*** | (2013.01) |
| ***A61G 5/10*** | (2006.01) |

(52) U.S. Cl.

CPC .......... *A61G 5/047* (2013.01); *A61G 5/1013* (2013.01); *A61G 5/1035* (2013.01)

(58) Field of Classification Search

CPC ................................ A61G 5/047; A61G 5/045

See application file for complete search history.

(56) References Cited

U.S. PATENT DOCUMENTS 6,547,018 B1 4/2003 Choi
7,311,160 B2 * 12/2007 Lim ........................ A61G 5/02 180/9.26

(Continued)

FOREIGN PATENT DOCUMENTS

DE 42 02 687 A1 8/1993
EP 3 539 521 A1 9/2019

(Continued)

*Primary Examiner* — Long T Tran

(74) *Attorney, Agent, or Firm* — NORTON ROSE FULBRIGHT CANADA LLP

(57) ABSTRACT

A motorization device for a wheelchair may have a positioning arm adapted to be connected to a frame of the wheelchair by at least one lockable joint. A motor block may be operatively connected to the positioning arm by at least one other lockable joint, the motor block including at least a motor and an output roller operatively coupled to the motor, the output roller configured to contact a wheel of the wheelchair to impart torque to the wheel. The positioning arm and the motor block collaborate to provide the motor block with an engaged configuration in which the motor block is configured to biasingly contact a wheel of the wheelchair, and a disengaged configuration in which the motor block is separated from the wheel of the wheelchair.

20 Claims, 15 Drawing Sheets

(56) References Cited

U.S. PATENT DOCUMENTS

| | | | | |
|---|---|---|---|---|
| 11,413,199 | B2 * | 8/2022 | Olsommer | A61G 5/02 |
| 2011/0233890 | A1 * | 9/2011 | Jutkiewicz | A61G 5/1094 280/202 |
| 2012/0007334 | A1 * | 1/2012 | Stuijt | A61G 5/12 248/118 |
| 2014/0262575 | A1 * | 9/2014 | Richter | A61G 5/022 180/11 |
| 2018/0280213 | A1 * | 10/2018 | Hancock | A61G 5/047 |
| 2018/0353356 | A1 | 12/2018 | Shim | |
| 2019/0046374 | A1 * | 2/2019 | Golden, Jr. | A61G 5/1083 |
| 2022/0031537 | A1 * | 2/2022 | Olsommer | A61G 5/048 |
| 2022/0117806 | A1 * | 4/2022 | King | A47L 11/4061 |

FOREIGN PATENT DOCUMENTS

| | | | |
|---|---|---|---|
| FR | 3 088 189 | A3 | 5/2000 |
| JP | 2006-26050 | A | 2/2006 |
| KR | 2010-0082425 | A | 7/2010 |
| WO | 2019/164259 | A1 | 8/2019 |
| WO | 2019/198884 | A1 | 10/2019 |
| WO | 2020/161447 | A1 | 8/2020 |

* cited by examiner

ARTICULATED MOTOR SUPPORT FOR WHEELCHAIR

CROSS-REFERENCE TO RELATED APPLICATION

The present application claims the priority of U.S. Patent Application No. 63/137,798, filed on Jan. 15, 2021, and incorporated herein by reference.

TECHNICAL FIELD

The present application relates to wheelchairs and, more particularly, to motorization of wheelchairs.

BACKGROUND OF THE ART

Some wheelchairs are motorized. Such motorized wheelchairs tend to differ from standard self-powered wheelchairs, in that the motorization system with battery, transmission, motor, is located under the seat. The user has access to a controller, such as a joystick, to then control the wheelchair.

There is however an interest in providing motorization to standard self-powered wheelchairs, in the form of propulsion assistance, contributing to the human effort in driving the wheelchair forward. Such a system would add wattage to a user's propulsion forces on the wheels of the wheelchair. However, there is a need for a motorization kit that can for example be retrofitted onto existing wheelchairs, or a motorization kit that can be readily installed on standard self-powered wheelchairs.

SUMMARY

It is an aim of the present disclosure to provide an articulated motor support for wheelchairs that addresses issues associated with the prior art.

Therefore, in accordance with an aspect of the present disclosure, there is provided a motorization device for a wheelchair comprising a positioning arm adapted to be connected to a frame of the wheelchair by at least one lockable joint, and a motor block operatively connected to the positioning arm by at least one other lockable joint, the motor block including at least a motor and an output roller operatively coupled to the motor, the output roller configured to contact a wheel of the wheelchair to impart torque to the wheel, wherein the positioning arm and the motor block collaborate to provide the motor block with an engaged configuration in which the motor block is configured to biasingly contact a wheel of the wheelchair, and a disengaged configuration in which the motor block is separated from the wheel of the wheelchair.

Further in accordance with the aspect, for example, a frame connector may be secured to a frame of the wheelchair, the positioning arm connected to the frame connector.

Still further in accordance with the aspect, for example, the frame connector includes a tube clamp for being clamped to the frame of the wheelchair.

Still further in accordance with the aspect, for example, the output roller has surface features thereon so as to be configured to contact a tire of the wheel.

Still further in accordance with the aspect, for example, an axis of rotation of the output roller is generally parallel to a plane of the wheel.

Still further in accordance with the aspect, for example, the at least one other lockable joint is a pivot joint.

Still further in accordance with the aspect, for example, an axis of rotation of the output roller is parallel to an axis of the pivot joint.

Still further in accordance with the aspect, for example, an indexing mechanism is provided between the positioning arm and the motor block for indexing the motor block between the engaged configuration and the disengaged configuration.

Still further in accordance with the aspect, for example, the indexing mechanism has an indexing arm and an indexing member.

Still further in accordance with the aspect, for example, the indexing arm is pivotally connected to the positioning arm and the indexing member is fixed to the motor block.

Still further in accordance with the aspect, for example, the indexing arm is spring-biased into engagement with the indexing member.

Still further in accordance with the aspect, for example, the indexing arm has a cam end pressing against a surface of the indexing member in the engaged configuration such that the indexing arm biases the motor block for contact against the wheel.

Still further in accordance with the aspect, for example, the motor block includes a transmission between the motor and the output roller.

Still further in accordance with the aspect, for example, the lockable joint is a spherical joint.

Still further in accordance with the aspect, for example, a ball of the spherical joint is at an end of a neck projecting from a body of the positioning arm.

Still further in accordance with the aspect, for example, the lockable joint includes a set screw for locking an orientation of ball.

In accordance with another aspect of the present disclosure, there is provided a motorization apparatus for a wheelchair comprising a bridge assembly adapted to be connected to opposite sides of a frame of the wheelchair; at least a pair of motorization devices, each of the motorization devices including: a positioning arm adapted to be connected to the bridge assembly by at least one lockable joint, and a motor block operatively connected to the positioning arm by at least one other lockable joint, the motor block including at least a motor and an output roller operatively coupled to the motor, the output roller configured to contact a wheel of the wheelchair to impart torque to the wheel, wherein the positioning arm and the motor block collaborate to provide the motor block with an engaged configuration in which the motor block is configured to contact a wheel of the wheelchair, and a disengaged configuration in which the motor block is separated from the wheel of the wheelchair.

Still further in accordance with the other aspect, for example, the output roller has surface features thereon so as to be configured to contact a tire of the wheel.

Still further in accordance with the other aspect, for example, an axis of rotation of the output roller is generally parallel to a plane of the wheel.

Still further in accordance with the other aspect, for example, the at least one other lockable joint is a pivot joint.

Still further in accordance with the other aspect, for example, an axis of rotation of the output roller is parallel to an axis of the pivot joint.

Still further in accordance with the other aspect, for example, an indexing mechanism is provided between the positioning arm and the motor block for indexing the motor block between the engaged configuration and the disengaged configuration.

Still further in accordance with the other aspect, for example, the indexing mechanism has an indexing arm and an indexing member.

Still further in accordance with the other aspect, for example, the indexing arm is pivotally connected to the positioning arm and the indexing member is fixed to the motor block.

Still further in accordance with the other aspect, for example, the indexing arm is spring-biased into engagement with the indexing member.

Still further in accordance with the other aspect, for example, the indexing arm has a cam end pressing against a surface of the indexing member in the engaged configuration such that the indexing arm biases the motor block for contact against the wheel.

Still further in accordance with the other aspect, for example, the motor block includes a transmission between the motor and the output roller.

Still further in accordance with the other aspect, for example, the lockable joint is a spherical joint.

Still further in accordance with the other aspect, for example, a ball of the spherical joint is at an end of a neck projecting from a body of the positioning arm.

Still further in accordance with the other aspect, for example, the lockable joint includes fasteners and a face-plate for locking an orientation of the ball.

Still further in accordance with the other aspect, for example, frame connectors may be configured to be secured to a frame of the wheelchair, the bridge assembly connected at its ends to one of the frame connectors.

Still further in accordance with the other aspect, for example, each of the frame connectors includes a tube clamp for being clamped to the frame of the wheelchair.

Still further in accordance with the other aspect, for example, at least one of the frame connectors has a brake lever mount.

Still further in accordance with the other aspect, for example, the bridge assembly includes a translational joint for releasable engagement with the frame connectors.

Still further in accordance with the other aspect, for example, the translational joint biases an arm of the bridge assembly into engagement with a respective one of the frame connectors.

Still further in accordance with the other aspect, for example, a detent mechanism between the bridge assembly and the frame connectors for releasing an engagement of the bridge assembly with the frame connectors.

Still further in accordance with the other aspect, for example, a controller unit may be in the bridge assembly, the controller unit for controlling the motors of the motor blocks.

Still further in accordance with the other aspect, for example, a battery may be in the bridge assembly.

Still further in accordance with the other aspect, for example, a biasing mechanism may be between the positioning arm and the motor block in at least one of the motorization devise, to bias the motor block into contact with the wheel.

DETAILED DESCRIPTION

Figure 1:
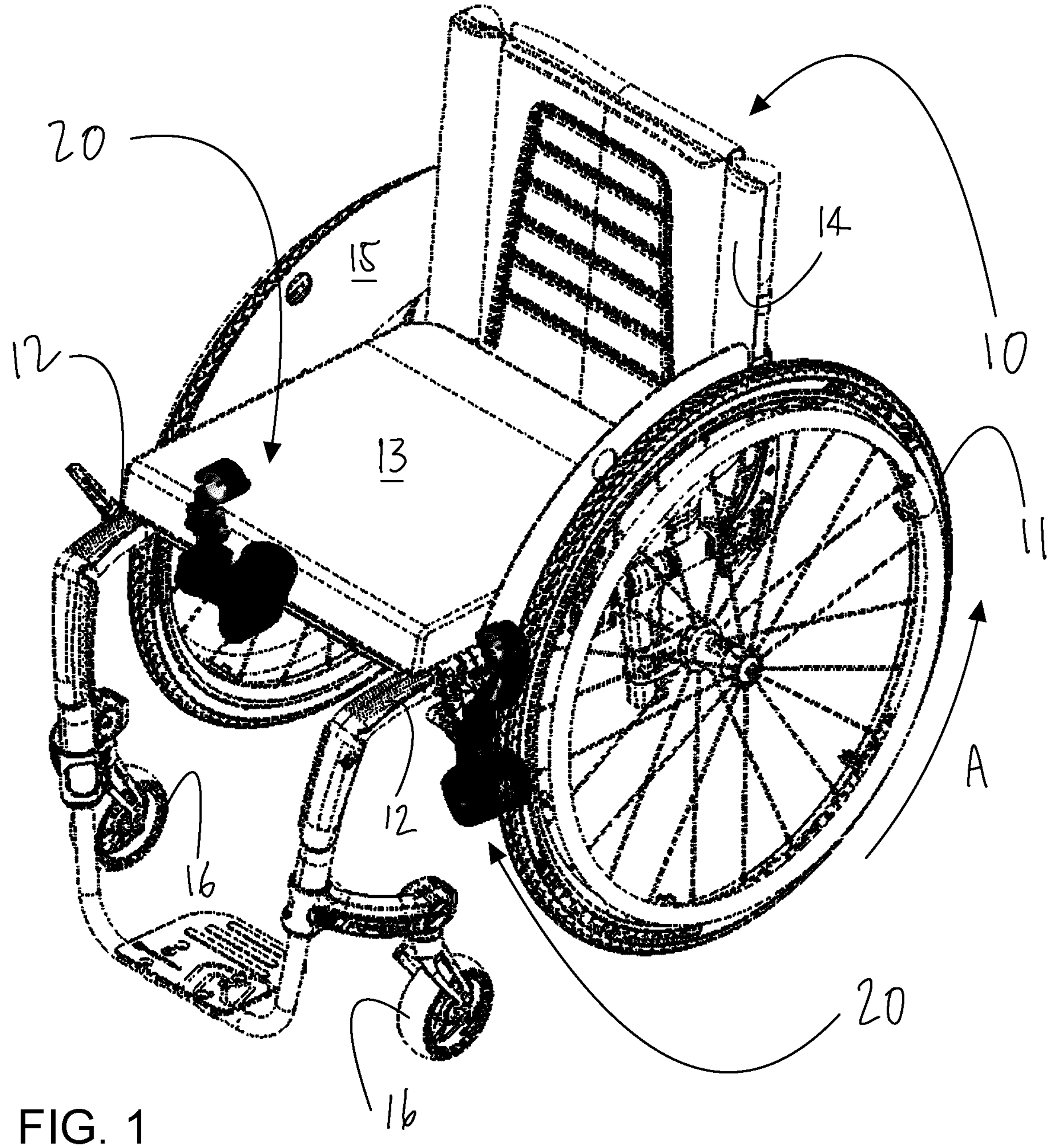
FIG. 1 is a perspective view of a wheelchair featuring motorization devices in accordance with an aspect of the present disclosure.
Figure 2:
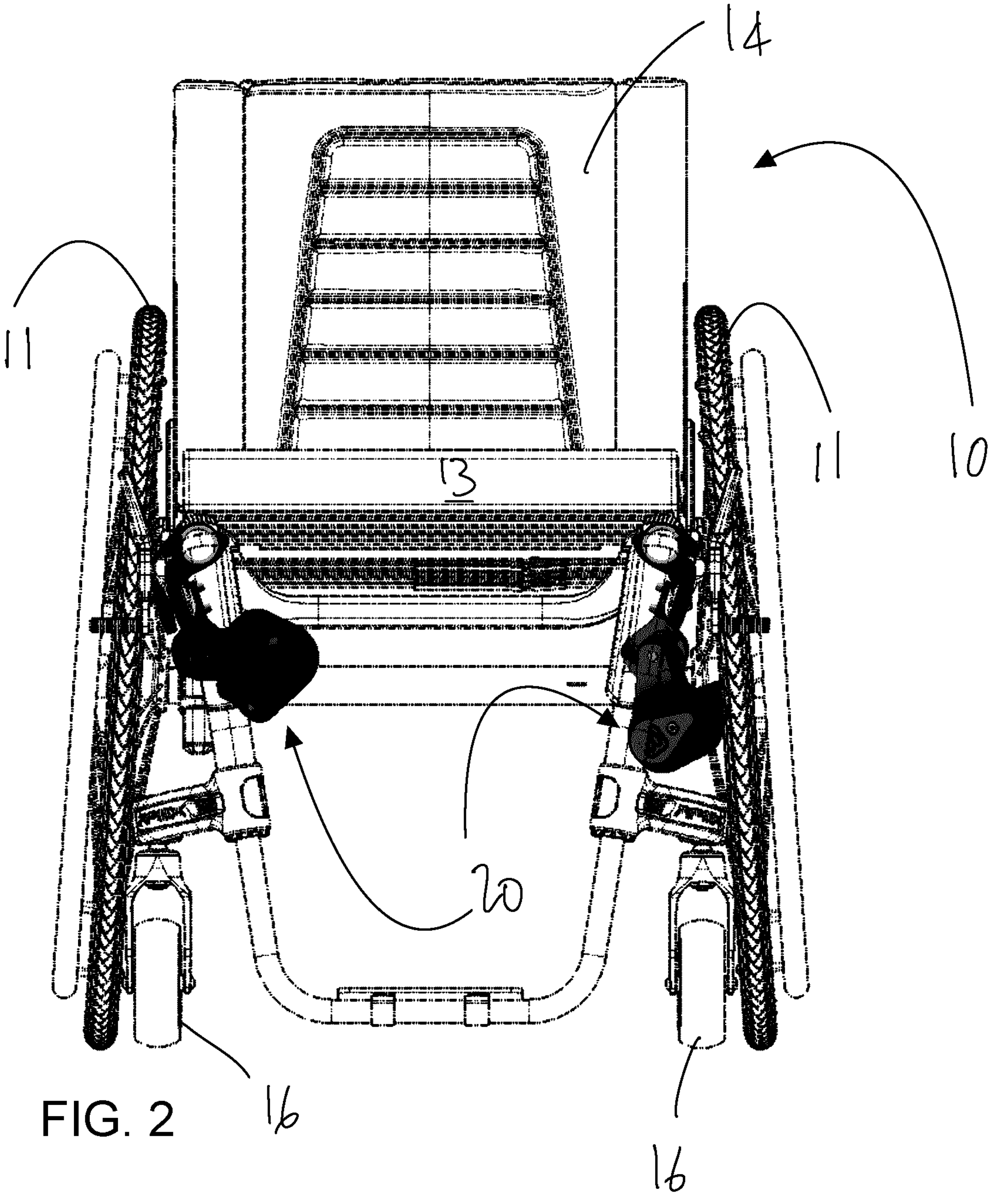
FIG. 2 is a front view of the wheelchair of FIG. 1, showing one of the motorization devices in an engaged configuration, and another of the motorization devices is an disengaged configuration.

Referring to the drawings and, more particularly, to FIGS. 1 and 2, a wheelchair with motorization devices is generally shown at 10. The wheelchair 10 has rear drive wheels 11 and a frame 12 having for example a plurality of tubular frame members, the frame 12 forming the structure supporting a plurality of components, such as rear wheel mounting brackets, a brake system, foot rests, etc. While not described in full detail, the frame 12 interfaces the wheels 11 to a seat 13, a backrest 14, armrests 15 and/or caster assemblies 16, among other components. For clarity, the rolling direction of the wheel 11 in a forward movement of the chair is illustrated by A. While the frame 12 has tubular frame members of circular cross-section, it may formed of other types of structural members as an alternative or as a complement to tubular members. For example, plates may be used.

A pair of motorization devices 20 are mounted to the frame 12. In the illustrated embodiment, one of the motorization devices 20 is mounted to the left-hand side of the wheelchair 10, while the other one of the motorization devices 20 is mounted to the right-hand side of the wheelchair 10. It is considered to have a single motorization device 20, whether on the left-hand side or the right- and side. The motorization devices 20 are essentially mirror-images of one another (though this is optional), depending on the side of the wheelchair 10 to which they will be mounted, if the wheelchair 11 has a pair of the motorization devices 20. In another aspect, the two motorization devices 20 of FIG. 1 are interconnected as part of a motorization apparatus 100, as shown in FIGS. 14 to 21. The motorization apparatus 100 may have two of the motorization devices 20, or motorization devices similar to shown at 20, with a bridge assembly interconnecting them. Accordingly, the description provided below for FIGS. 1 to 13 may extend to the aspect of FIGS. 14 to 21.

The motorization devices 20 are configured to be displaced between an engaged configuration with the wheel 11, as shown for the right-hand side motorization device 20, and a disengaged configuration with the wheel 11, as shown for the left-hand side motorization device 20. In the engaged configuration, the motorization device 20 drives the wheel 11, while in the disengaged configuration, the motorization device 20 does not contact the wheel 11. The motorization devices 20 are also configured to impart a driving torque to the wheel 11 by being in contact with a tire or tyre of the wheel 11. The motorization devices 20 could alternatively come into engagement contact with a rim of the wheel 11, for example. The motorization device(s) 20 may impart a driving torque concurrently with a driving torque being applied by a user of the wheelchair 10.

Figure 3:
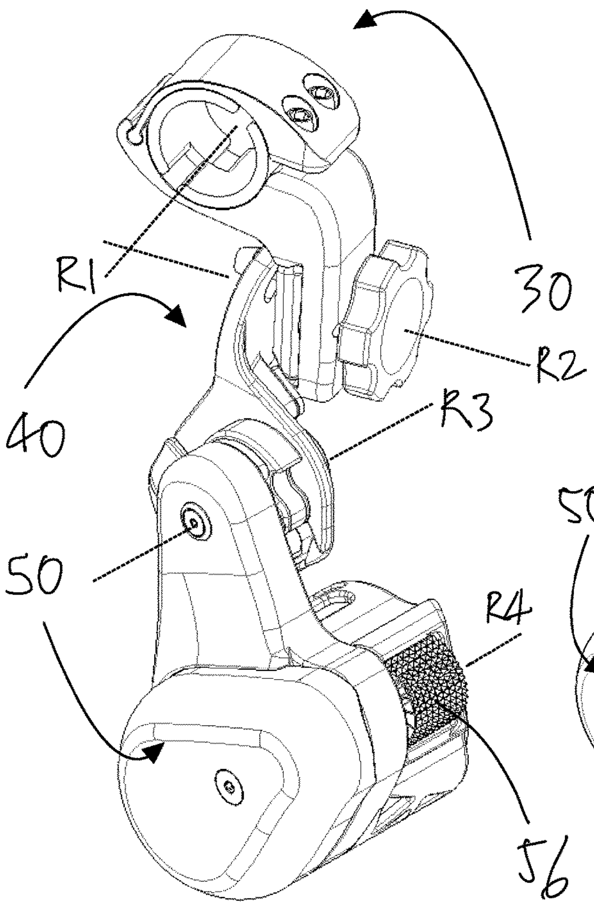
FIG. 3 is a perspective view of the motorization device in the engaged configuration.
Figure 4:
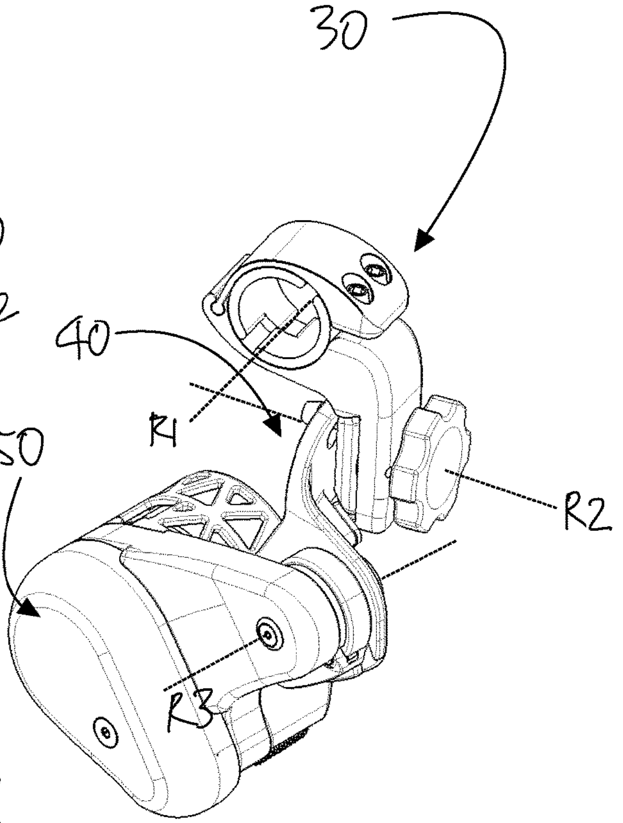
FIG. 4 is a perspective view of the motorization device in the disengaged configuration.

Referring to FIGS. 3 and 4, one of the motorization devices 20 is shown in greater detail. For simplicity, reference is made to a single one of the motorization devices 20. The motorization device 20 has an articulated motor support by which it may achieve the engaged configuration and the disengaged configuration. The articular motor support may have three or more serially interconnected links, namely a frame connector 30, a positioning arm 40 and a motor block 50. While the monikers do not refer to "links", the frame connector 30, the positioning arm 40 and the motor block 50 are rigid components interconnected by rotational joints, and may hence be said to be links in the mechanism sense. The links may be arranged as follows:

The frame connector 30 interfaces the motorization device 20 to the frame 12. The frame connector 30 may form a cylindrical joint with the frame, with rotation possible about axis R1. Other types of joints are possible, such as a sliding joint (i.e., translation only), or the frame connector 30 may be secured to the frame without a possibility of adjustment, in a variant. Axis R1 may be coincident with a central axis of the tubular member of the frame 12, to which the frame connector 30 is connected. The frame connector 30 may translate in a direction parallel to axis R1.

Figure 5:
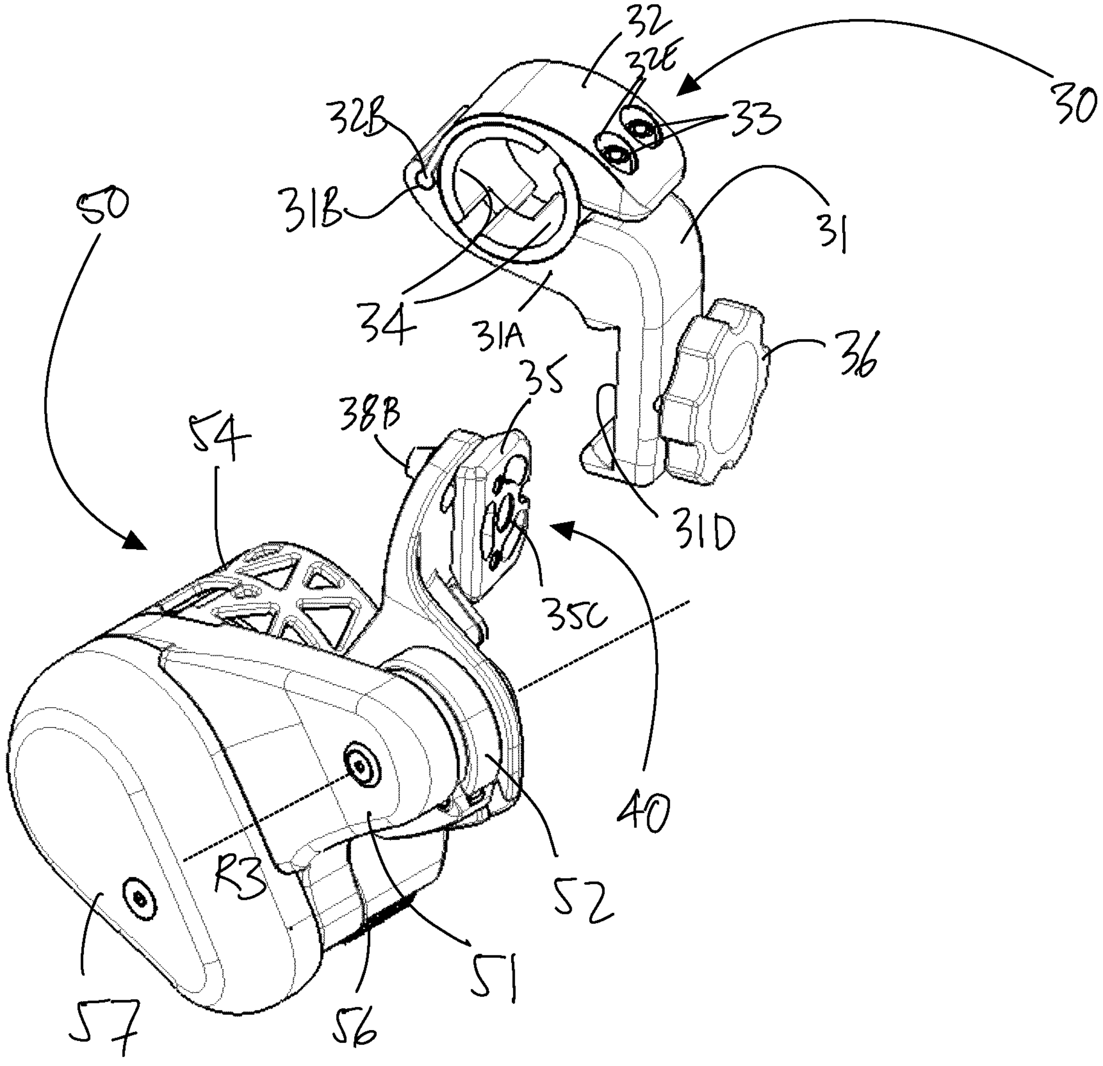
FIG. 5 is a perspective view illustrating a positioning arm and motor block detached from a frame connector in the motorization device of FIGS. 3 and 4.

The positioning arm 40 is pivotally connected to the frame connector 30, and provides the scope of movement to the motorization device 20, i.e., between the engaged configuration and the disengaged configuration. The positioning arm 40 may also be tasked with ensuring that the motor block 50 is tensioned, i.e., pressed, against the wheel 11 in the engaged configuration. The frame connector 30 and positioning arm 40 are pivotally connected at axis R2. As shown in FIG. 5, the positioning arm 40 and motor block 50 may be detached from the frame connector 30. Even though a joint with a single axis of rotation R2 is shown, other joint types may be used between the frame connector 30 and the positioning arm 40, such as a ball joint or a pair of hinges.

The motor block 50 houses the motor and has a component that comes into contact with the wheel 11 to impart the driving torque. The positioning arm 40 and the motor block 50 are pivotally connected at axis R3. The driving torque is about axis R4. More than one rotational degree of freedom may be present between the positioning arm 40 and the motor block 50.

Figure 6:
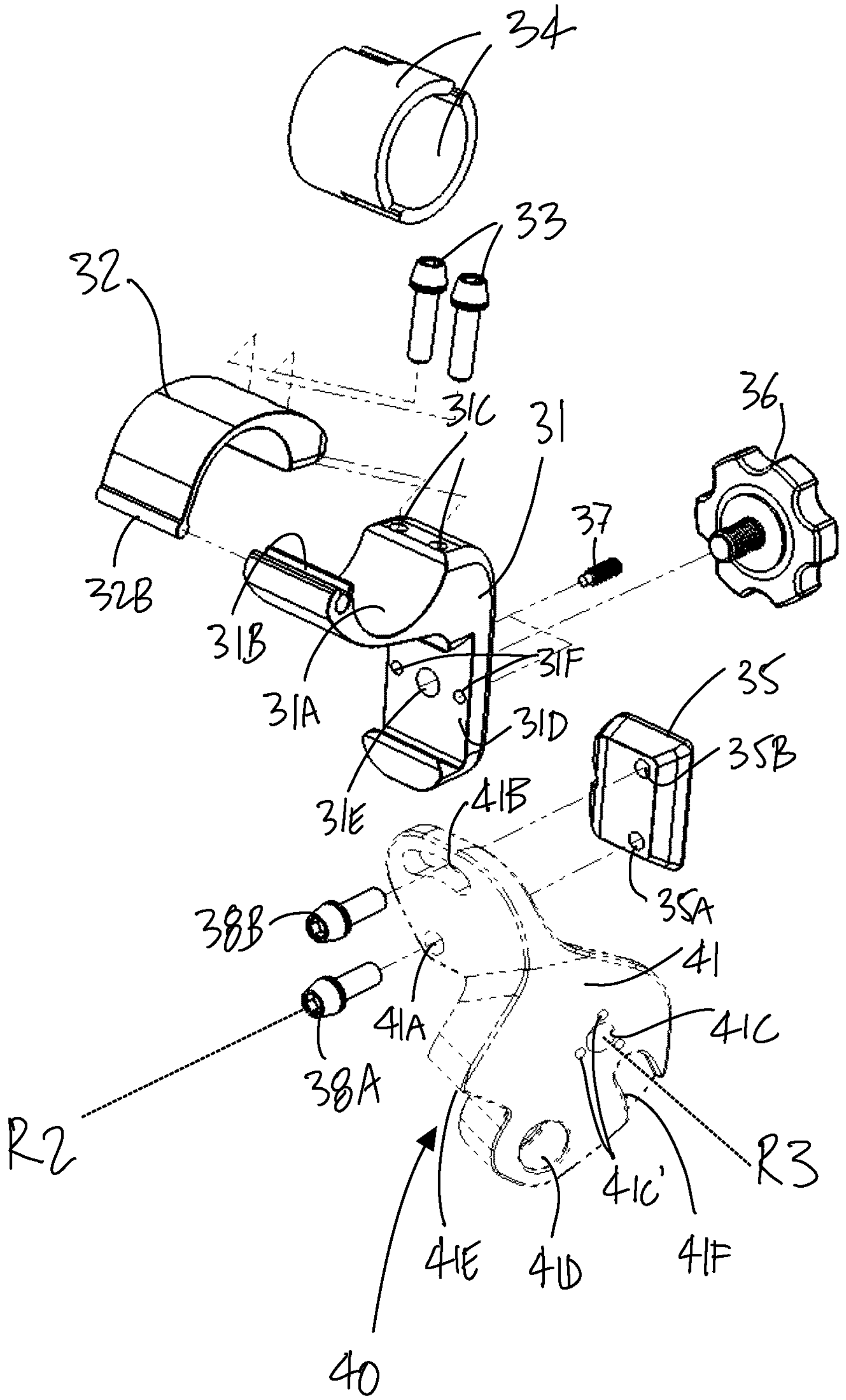
FIG. 6 is an exploded view of the frame connector of the motorization device of FIGS. 3 and 4.
Figure 7:
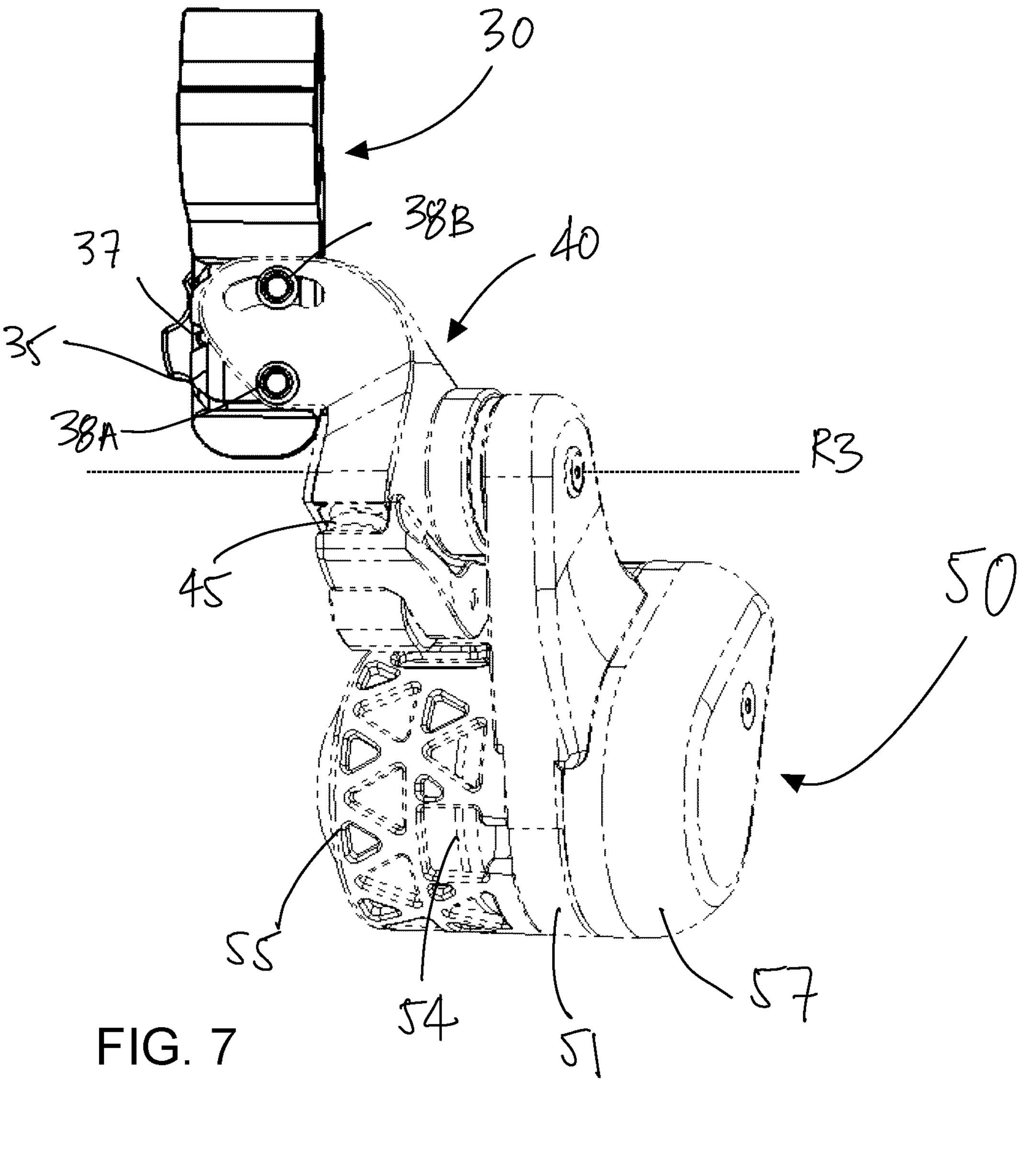
FIG. 7 is a perspective view of the motorization device of FIGS. 3 and 4, with an axis R2 normal to a plane of the figure sheet.

Referring to FIGS. 5 and 6, the frame connector 30 is shown having a bracket 31. The bracket 31 is a structural components of the frame connector 30, and is therefore made of a rigid material, such as a metal. In an embodiment, the bracket 31 is a cast piece, but other constructions are contemplated (e.g., machined component). The bracket 31 has a clamp portion 31A, shown as having a U-shape with a hemi-cylindrical concavity. A pivot portion 31B is present at an edge of the clamp portion 31A. The pivot portion 31B may be a cylindrical receptacle with an elongated slit, for example. Other configurations are considered, including a pin. Fastener holes 31C are provided along the other edge of the clamp portion 31A, the holes 31C being threaded.

The frame connector 30 may further define a hook portion 31D. In the illustrated embodiment, the hook portion 31D defines a cavity that has a trapezoidal cross-section, as a possibility among others. The hook portion 31D may further include holes 31E and 31F, shown in different sizes, the use of which is described below.

A clamp member 32 is complementarily connected to the bracket 31, so as to be pivotable therewith. The clamp member 32 also has a U-shape with a hemi-cylindrical concavity, concurrently forming a cylindrical passage with the clamp portion 31A of the bracket 31, for receiving the cylindrical tube of the frame 12 therein, i.e., a tube clamp, though this is merely an option as the tube may not be cylindrical in shape. For example a sliding joint (i.e., single translational DOF) or no joint at all are options. The joint may be embedded in the frame connector 30, such that the frame connector 30 itself is in a fixed relation with the frame 12. A pivot portion 32B is present at an edge of the clamp member 32. The pivot portion 32B may be a pin to be received in the pivot portion 31B. Other configurations are considered, with for example the pivot portion 32B being the receptacle, in a reversal of roles over the current arrangement. As an alternative to the clamp member 32 being detachable from the bracket 31, the clamp member 32 may be an integral part of the bracket 31 to form a C-clamp, with the clamp being configured to elastically deform.

Fastener holes 32C are provided along the other edge of the clamp member 32. The fastener holes 32C are aligned with the fastener holes 31C, for fasteners 33, such as bolts, or the like, to close the clamp defined concurrently by the clamp portion 31A and the clamp member 32. The fastener holes 32C may or may not be threaded, with the fasteners 33 operatingly engaged with the threading in the fastener holes 31C. As shown in FIG. 6, the fastener holes 32C may have a counterbore.

Bushings 34 may optionally be present as part of the frame connector 30, to act as contact interface with the tubular member of the frame 12. The bushings 34 may also be referred to as tube adaptors. In an embodiment, the bushings 34 are made of a polymer that will be compressed when the clamp is tightened. The bushings 34 may have a greater elasticity than the bracket 31 and clamp member 32, both made of a metallic material in an embodiment, such that the bushings 34 may prevent damages to the frame 12 when a clamping force is high. The bushings 34 have a capacity of transmitting clamping force while deforming, to ensure that the frame connector 30 is immobilized relative to the frame 12.

Alternatives to the clamp may be used to secure the motorization device 20 to the frame 12, such as brackets, collars, etc. The clamp defined by the frame connector 30 or equivalent may also be part of the frame 12, instead of being a part of the motorization device 20. The frame connector 30 may be bolted directly to the frame 12, instead of being clamped to the frame 12. The shown arrangement however has the benefit of being adjustable in position and configuration via the cylindrical joint formed concurrently by the frame 12 and frame connector 30, i.e., in rotation about axis R1, and in translation in a direction parallel to axis R1. The shown arrangement can also be retroffited to existing wheelchairs having cylindrical tubes or other types of tubes (with an appropriate clamp or connection means for the frame connector 30), and the bushings 34 may be of various sizes to fit the frame connector 30 to wheelchairs having different tube diameters.

Still referring to FIGS. 5 and 6, the frame connector 30 may further include a pivot plate 35. The pivot plate 35 is operatively connected to the positioning arm 40 and is thus the component of the frame connector 30 that is interfaced with the positioning arm 40. As shown in FIG. 5, the pivot plate 35 has fastener holes 35A and 35B on a front face. The fastener holes 35A and 35B are used with pivot 38A and stopper 38B, respectively.

The pivot plate 35 may be shaped to be received in the hook portion 31D. Consequently, the pivot plate 35 may have a corresponding shape, such as with the trapezoidal cross-section, as an option. The complementary shapes ensure that the pivot plate 35 is snugly received in the hook portion 31D. The hook portion 31D is open laterally, such that the pivot plate 35 may be slid into engagement with the hook portion 31D. Release fastener 36 may be used to releasably secure the pivot plate 35 to the hook portion 31D. The release fastener 36 passes through hole 31E to reach a threaded hole 35E in a rear face of the pivot plate 35 (FIG. 6). Set screw 37 in hole 31F may assist in aligning the pivot plate 35 in the hook portion 31D, for the hole 31E to be in register with the hole 35E. The set screw 37 may act as a stopper for the sliding movement of the pivot plate 35 into the hook portion 31D. In an embodiment, the bracket 31 is the same whether used on a left-side motorization device 20 or a right-side motorization device 20. For this reason, there are a pair of holes 31F for the set screw 37, depending on the side of use of the bracket 31. The release fastener 36 may have a knob, to be manipulated without tools. This is merely optional.

The pivot plate 35 is conveniently detachable from the bracket 31, such that most of the frame connector 30 may remain connected to the frame 12, which the positioning arm 40 and motor block 50 may be detached. Accordingly, if the positioning arm 40 and motor block 50 are removed for any reason (e.g., travel, stowing, theft prevention), their setting is preserved to be functional once reinstalled on the wheelchair 10 via the frame connector 30. Stated differently, the mechanical settings are preserved such that the motorization device 20 is ready for use once reinstalled. This may also for instance facilitate maintenance, repair and/or recharge of the active parts of the motorization device 20. These components may be removed manually, without tools, if the release fastener 36 has the illustrated knob. It is however contemplated to have an arrangement with fasteners requiring tools, if it is desired to complexify the removal of the positioning arm 40 and motor block 50, for instance to avoid theft. For example, the positioning arm 40 could be connected directly to the bracket 31, i.e., without a pivot plate. In such an arrangement, the bracket 31 would be without a hook portion, and could have a flat tab for connection of the positioning arm 40 thereto.

Figure 8:
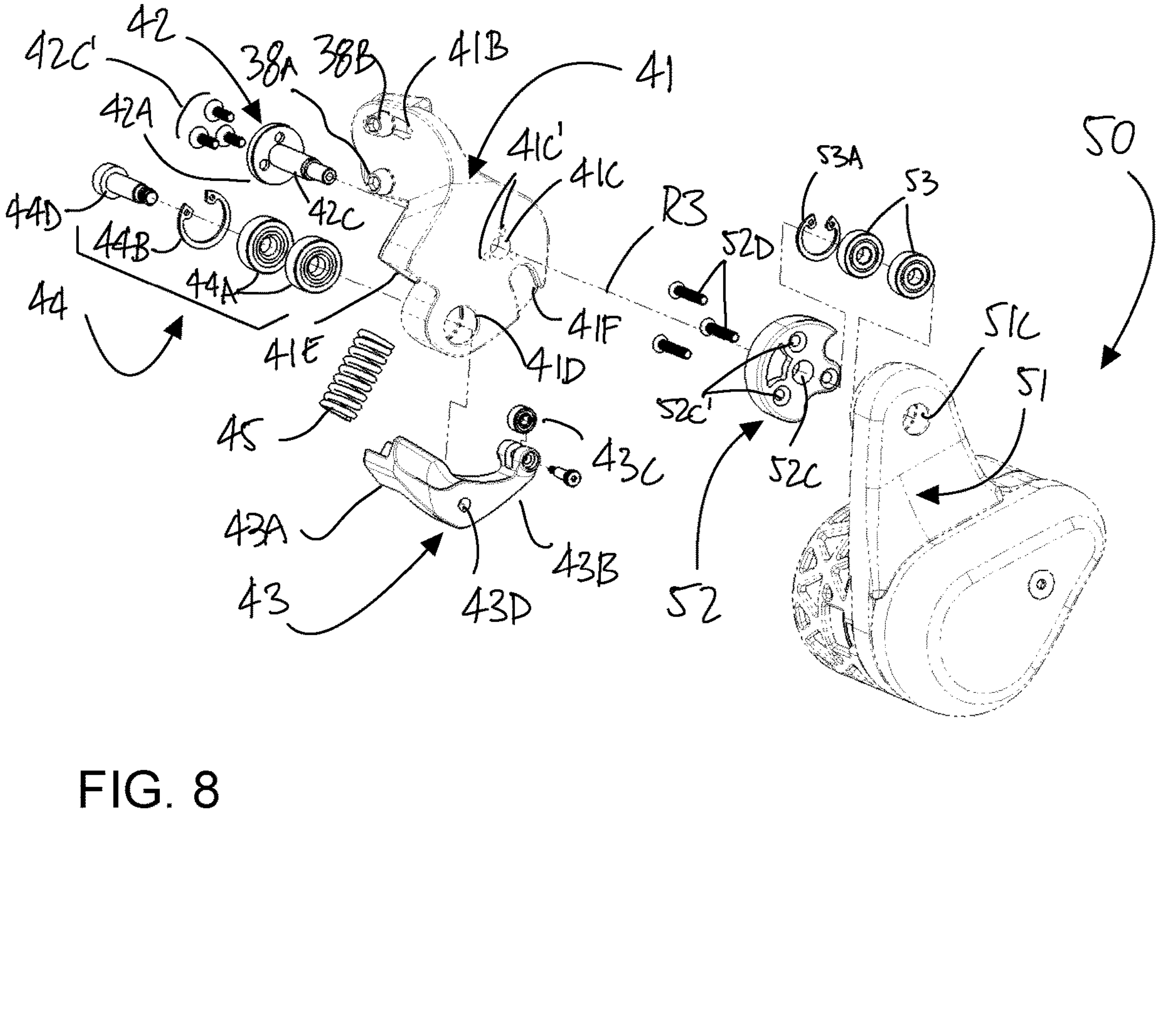
FIG. 8 is an assembly view of the positioning arm and of the motor block of the motorization device of FIGS. 3 and 4.

Referring to FIGS. 6 and 8, the positioning arm 40 has a body 41. The body 41 may be a monolithic piece, for instance cast or machined in a metallic material. The body 41 has a structural function, in that it may hold the motor block 50 pressed against the wheel 11, in cantilevered fashion relative to the frame connector 30. Hence, the construction of the body 41 takes into consideration the structural integrity required for the forces to which the body 41 will be exposed.

In a flat-like portion of the body 41, a pivot hole 41A and a stopper slot 41B are defined. The pivot hole 41A and the stopper slot 41B are used in conjunction with the fastener holes 35A and 35B, and the pivot 38A and the stopper 38B, respectively. More specifically, the pivot 38A passes through the pivot hole 41A when attached to the fastener hole 35A. Accordingly, the pivot 38A defines rotational axis R2, about which the positioning arm 40 may rotate relative to the frame connector 30. The pivot 38A is a solution among others, as a ball joint could be used, such as in the variant of FIGS. 14-21. In an embodiment, the pivot 38A is a fastener, such as a bolt or screw, though the pivot 38A could be an integral component of the frame connector 30 or of the positioning arm 40, for example.

The stopper slot 41B may optionally be present, to delimit the course of movement of the positioning arm 40 relative to the frame connector 30. Due to the rotational movement between these components, the stopper slot 41B may be arcuate, as shown. The stopper 38B passes through the stopper slot 41B when attached to the fastener hole 35B. Other stopping arrangements could be used as alternatives to the stopper slot, including abutments on an edge of the body 41, projecting tabs, etc. The stopper 38B may provide a lockable function to the pivot joint featuring the pivot 38A. By tightening the stopper 38B, the positioning arm 40 may be blocked from rotating relative to the frame connector 30. The joint (axis R2) between the frame connector 30 and the positioning arm 40 may thus be said to be lockable. The joint between the frame connector 30 and the positioning arm 40 may be said to provide one rotational degree of freedom (DOF) at pivot 38A, and may be said to provide one translational DOF, via the pivot plate 35.

As shown in FIGS. 6 and 8, the body 41 may also have pivot hole 41C. The pivot hole 41C may be part of the pivot joint between the positioning arm 40 and the guide block 50, i.e., defining rotational axis R3. Satellite holes 41C' may surround the pivot hole 41C, for connection of a pivot shaft 42 to the body 41 as described below. The pivot shaft 42 may have a base plate 42A from which projects shaft 42C. The shaft 42C passes through the pivot hole 41C. The shaft 42C is sized so as to project beyond a surface of the body 41, for the motor block 50 to be rotatably mounted to the projecting end of the shaft 42C. Consequently, a central axis of the shaft 42C is coincident with rotational axis R3. Satellite holes are defined in the base plate 42A, and are aligned with the satellite holes 41C' in the body 41, to anchor the pivot shaft 42 to the body 41, for instance by way of fasteners 42C' (e.g., bolts, screws). In an embodiment, the base plate 42A may be permanently secured to the body 41, such as by welding. In an alternative embodiment, the shaft may be an integral part of the body 41, or may be an integral part of the motor block 50. The shaft 42C is shown having a shoulder with a reduction of diameter. This geometry is optional, and depends on the components used in the pivot.

The body 41 may further include another pivot hole 41D, to be used with an indexing arm 43, for the indexing arm 43 to rotate relative to the body 41. In an embodiment, the body 41 has an abutment 41E and a receptacle 41F, to assist in the operation of the indexing arm 43. The pivot hole 41D may define a counterbore as a possibility.

Figure 9:
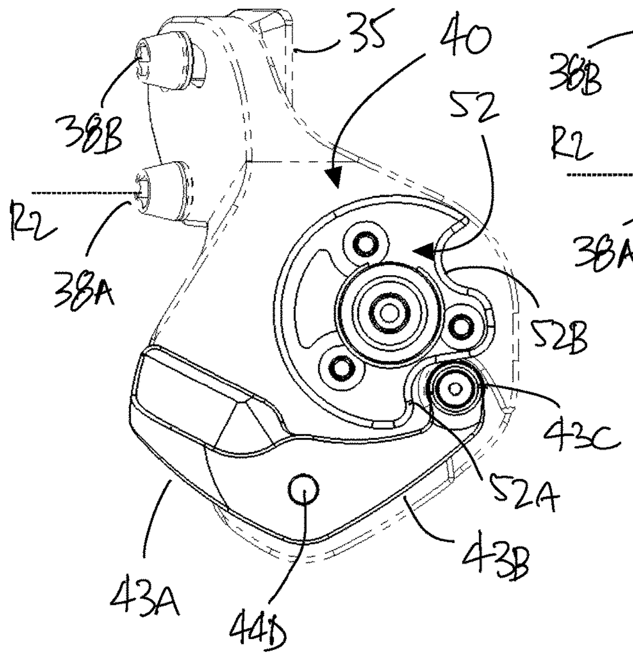
FIG. 9 is an elevation view showing an indexing arm in an engagement receptacle of an indexing member, corresponding to the engaged configuration of FIG. 3.
Figure 10:
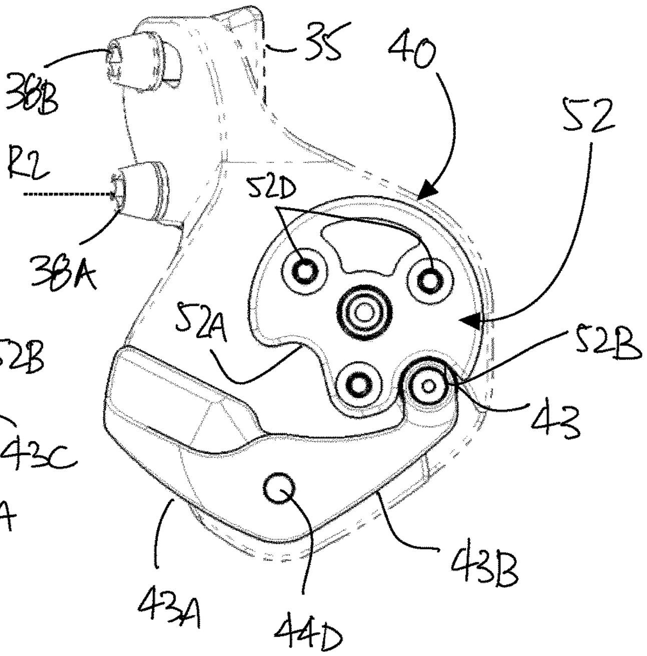
FIG. 10 is an elevation view showing the indexing arm in a disengagement receptacle of the indexing member, corresponding to the disengaged configuration of FIG. 4.

Referring to FIGS. 8, 9 and 10, the indexing arm 43 is shown having monolithic body portion having a detent end 43A and a cam end 43B. The indexing arm 43 is described below as being pivotable, but other indexing mechanism configurations are contemplated, if present (indexing may be optional between positioning arms and motor blocks described herein). For example, a sliding pin could be used for the indexing. A bearing 43C may optionally be secured to the cam end 43B, via fastener 43C' as a possibility, for a contact surface of the cam end 43B to be that of the bearing 43C. The cam end 43B may come into contact with the motor block 50 as discussed below. The presence of the bearing 43C may reduce friction and facilitate the relative movement between the indexing arm 43 and the motor block 50.

A pivot hole 43D may be located between the detent end 43A and the cam end 43B. The pivot hole 43D is aligned with the pivot hole 41D in the body 41. A pivot assembly 44 may be used in conjunction with the pivot holes 41D and 43D, for the indexing arm 43 to be pivotally mounted to the body 41. In an embodiment, axes of the pivot shaft 42 and of the pivot assembly 44 are parallel or close to being parallel—the axes may lie in a common plane. The pivot assembly 44 may include one or more bearings 44A, received in the pivot hole 41D. In such an arrangement, the pivot hole 41D has a counterbore to accommodate the bearing(s) 44. A circlip 44B may be one option to hold the bearing(s) 44 in the pivot hole 41D, other options being a plug, a nut, etc. Pivot member 44D, for instance in the form of a screw, is rotatingly supported by the bearing(s) 44, if present, or may be rotatingly connected to the body 41 in other manners. The pivot member 44D is screwed to the pivot hole 43D, such that the indexing arm 43 is retained to the body 41 and may pivot via the pivot member 44D. The direct screwing of the pivot member 44D is an option among others to pivotally hold the indexing arm 43 to the body 41. Another option would include a nut and washer at the end of the pivot member 44D. As another option, the pivot member may be an integral part of the body 41 or of the indexing arm 32.

Figure 11:
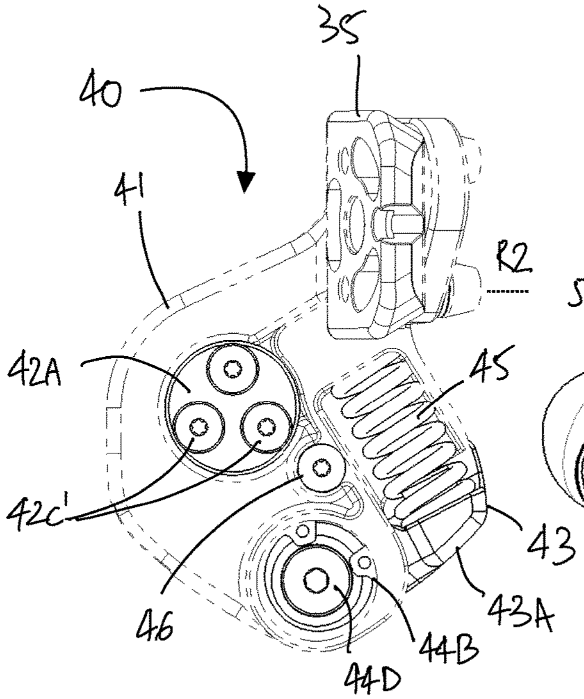
FIG. 11 is an elevation view of the positioning arm of the motorization device of FIGS. 3 and 4.

In operation, spring 45 or like biasing member applies a biasing force to the detent end 43A of the indexing arm 43, with the cam end 43B received in the receptacle 41F. The biasing spring 45 is abutted against the abutment 41E of the body 41, and against a surface of the detent end 43A. Therefore, the indexing arm 43 is biased such that the cam end 43B is forced into the receptacle 41F. A geometry of the body 41 in the vicinity of the pivot 41D and of the abutment 41E is such that, upon exerting a manual force on the detent end 43A, the cam end 43B moves out of the receptacle 41F. The receptacle 41F is optional, but conceals partially the cam end 43B, to reduce pinching instances, when the indexing arm 43 is manipulated. The spring 45 may be concealed by a cover plate (not shown), also to avoid pinching points. The cover plate may be attached to the body 41 via fastener 46 (FIG. 11).

Figure 12:
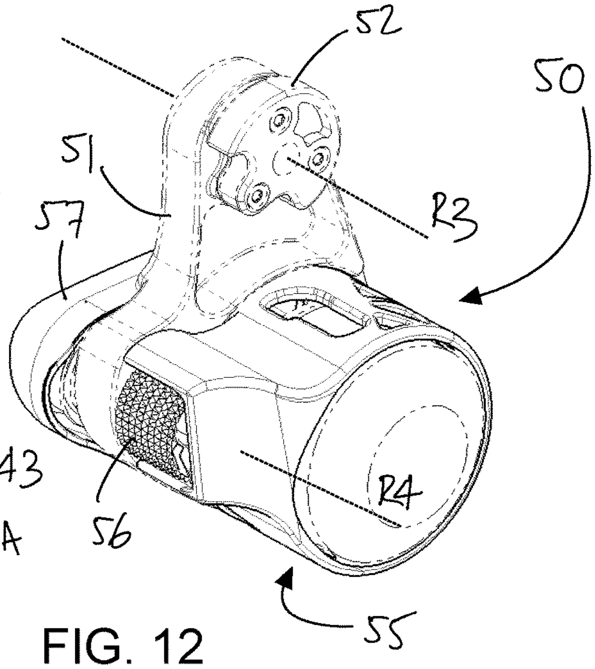
FIG. 12 is a perspective view of the motor block of the motorization device of FIGS. 3 and 4.
Figure 13:
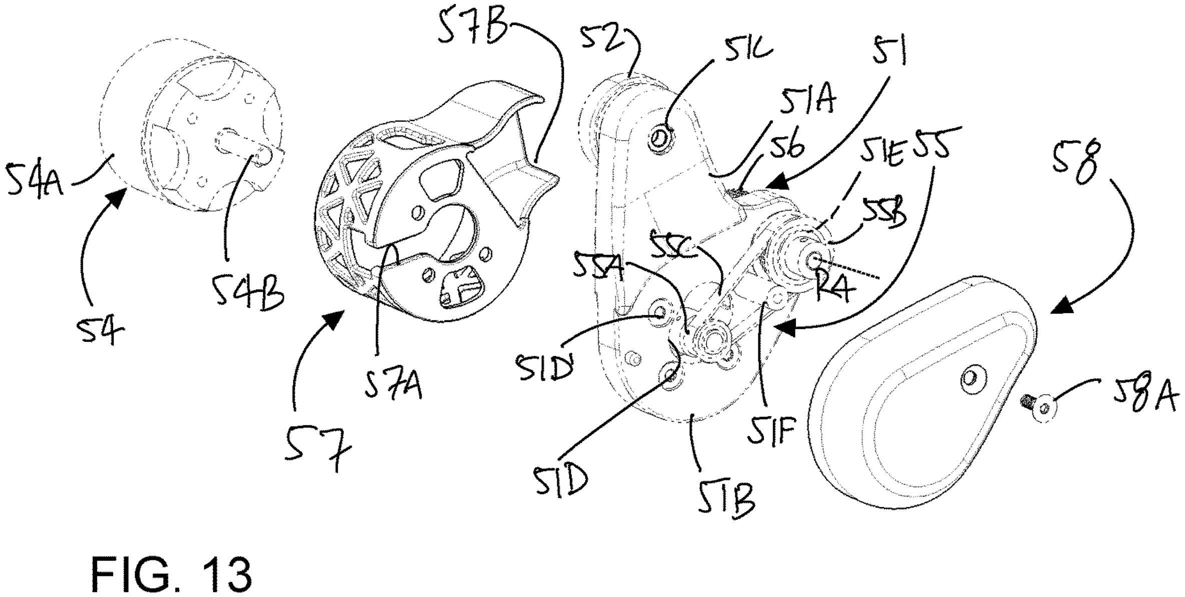
FIG. 13 is an exploded view of the motor block of FIG. 12.

Referring now to FIGS. 8, 12 and 13, the motor block 50 is shown having a main body 51. The main body 51 may be a monolithic piece, for instance cast or machined in a metallic material. The body 51 has a structural function, in that it is cantilevered from its connection with the positioning arm 40 to the wheel 11, and supports the motor to transmit a driving torque to the wheel 11. Hence, the construction of the body 51 takes into consideration the structural integrity required for the forces to which the body 51 will be exposed.

The body 51 may have a V-like shape, with a motor-support portion 51A and a pivot portion 51B projecting from the motor-support portion 51A. A pivot hole 51C is located at an end of the pivot portion 51B, and is pivotally connected to the shaft 42C of the positioning arm 40, such that rotation of the motor block 50 relative to the positioning arm 40 at axis R3 occurs via the pivot hole 51C. Pivot hole 51C may feature a counterbore to receive bearing(s) therein as described below.

Referring to FIGS. 8 and 12, an indexing member 52 is connected to the pivot portion 51B of the main body 51. The indexing member 52 has an engagement receptacle 52A, and a disengagement receptacle 52B, configured to receive therein the cam end 43B of the indexing arm 43. The indexing member 52 may further include a bore 52C, centered with the shaft 42C and the pivot hole 51C when the motor block 50 is pivotally connected to the positioning arm 40. Satellite holes 52C' surround the bore 52C, and are present to integrally secure the indexing member 52 to the main body 51, such that the main body 51 and the indexing member 52 move together. Fasteners 52D are one contemplated solution to secure the indexing member 52 to the main body 51, and the fasteners 52D are received in corresponding holes in the main body 51. Welding, monoblock manufacturing, are other options to connect the main body 51 to the indexing member 52.

Referring to FIGS. 3, 4, 9 and 10, the cooperation between the indexing arm 43 and the indexing member 52 is shown. In FIG. 9, the cam end 43B of the indexing arm 43 is in the engagement receptacle 52A. This corresponds to the engagement orientation of the motorization device 20 with the wheel 11, as in FIG. 3. In the engagement orientation, the cam end 43B floats (rolls if bearing 43C is present, or slides) against the surface of the engagement receptacle 52A, i.e., it is not indexed to a fixed position. Stated differently, the arm 43 exerts a pressure on the indexing member 52 by the camming action of the cam end 43B onto the surface of the engagement receptacle 52A. This results in a biasing pressure of the indexing arm 43 onto the motor block 50, namely from the biasing force of the spring 45. Therefore, in the engagement orientation, the motor block 50 (and roller 56) is biased against the wheel 11 of the wheelchair 10, by the action of the positioning arm 40. Moreover, due to the configuration of the cam end 43B and surface of the engagement receptacle 52A, some camming action occurs, such that a suitable proportional force may be applied to the motor block 50 for proper traction to occur between the roller 56 and the wheel 11. Though a camming action is shown, other configurations are possible for the spring 45 to bias the motor block 50 against the wheel 11. Therefore, a camming mechanism is present between the positioning arm 40 and the motor block 50, including the indexing arm 43 and the indexing member 52. Other configurations of camming mechanisms or biasing mechanisms may be used. The biasing mechanism may be part of the indexing mechanism, as described above, or may take simpler forms, like a spring between the positioning arm 40 (140) and the motor block 50, to bias the motor block 50 against the wheel 11. As an example, the motor block 50 may be forced against the wheel 11 in a set arrangement (engaged configuration), with the motor block 50 apply pressure by the action of a spring in such set arrangement. The set arrangement may be achieved by a spring-loaded pin that may for example be indexing the motor block 50 to the positioning arm 40 (140). The biasing and/or camming may be adjusted to ensure an optimal transmission of torque to the wheel 11. The selection of the spring 45 or like biasing component, as well as the orientation setting of the joints between the frame connector 30/130, positioning arm 40/140 and motor block 50 (and bridge assembly 120 where applicable) enable such optimal torque transmission.

A user may press on the detent end 43A of the indexing arm 43, for the cam end 43B to move out of the engagement receptacle 52A, allowing the motor block 50—including the indexing member 52—to rotate about axis R3 (normal to a plane of the page of FIGS. 9 and 10) by way of a manipulation of the motor block 50. The motor block 50 may be rotated toward the orientation of FIGS. 4 and 10, the disengaged configuration, at which point the detent end 43A may be released, for the cam end 43B to be received in the disengagement receptacle 52B. The motor block 50 may thus be locked into the disengaged configuration as in FIG. 4. A bridge between the receptacles 52A and 52B may define a smooth curved shape, for the bearing 43C, if present, to move smoothly from one of the receptacles to the other. The arrangement with the indexing in the engaged and disengaged configurations adds a locking functionality to the joint between the positioning arm 40 and the motor block 50. A reverse arrangement may be used, with the indexing member 52 being on the positioning arm 40, for example.

Referring to FIG. 8, bearing(s) 53 may be present to interface the motor block 50 to the shaft 42B of the positioning arm 40, about rotational axis R3. The bearing(s) 53 may be lodged in the counterbore of the pivot hole 51C, so as to be rotatingly connected to the shaft 42C. A circlip 53A may be present to hold the bearing(s) 53 captive in the pivot hole 51C. A fastener, not shown, may be threadingly engaged to the shaft 42B to hold the assembly together. The bearing(s) 53 are optionally, as the shaft may be part of the main body 51, as a possibility.

As shown in FIG. 13, the main body 51 may include a first shaft hole 51D, with satellite fasteners 51D', a second shaft hole 51E, and a spacer 51F among other components. These features are present for the connection of a motor 54, a transmission 55, an output roller 56, a motor cover 57 and/or a transmission cover 58 to the main body 51.

Referring to FIG. 13, the motor 54 is shown having a casing 54A and a shaft 54B. The shaft 54B passes through the first shaft hole 51D to be coupled to the transmission 55. The transmission 55 has a first pulley 55A coupled to the shaft 54B, a second pulley 55B, and a belt 55C. The transmission 55 may perform a reduction of speed (or speed increase), for example, as the second pulley 55B has a larger diameter than the first pulley 55A. The transmission 55 is optional as a direct drive arrangement is considered. Moreover, the transmission 55 may be gears, chain and sprockets, a reduction gear box, etc. The second pulley 55B is coupled to a shaft of the output roller 56, for the motor 54 to drive the output roller 56. The shaft passes through the second shaft hole 51E.

Spacer 51F has a bore at its free end, to receive fastener 58A by which the transmission cover 58 may be attached to the body 51. Therefore, the transmission cover 58 may conceal parts of the transmission 55.

The output roller 56 receives a drive from the motor 54, via the transmission 55. The output roller 56 may share or be coupled to a shaft of the second pulley 55B, rotating about axis R4. In an embodiment, the output roller 56 is a cylindrical roller, with surface features. For example, the output roller 56 may be knurled, or have gripping projections thereon, such as radially oriented surface projections. Axis R4 may be said to be generally parallel to a plane of the wheel 11. The plane of the wheel 11 has a vector of rotational axis of the wheel 11 normal to it. Generally parallel may include ±10 degrees. Other arrangements are possible, with axis R4 being generally parallel to the axis of rotation of the wheel 11.

The motor cover 57 defines a housing that is used to conceal the motor 54. The motor cover 57 includes a slot 57A through which the shaft 54B may pass, with the slot 57A also allowing wires to be reach the motor 54. The motor cover 57 may have a cage-like portion, for example to enable heat dissipation with the surrounding environment. The motor cover 57 may further include an opening 57B, through which a part of the output roller 56 is exposed. The opening 57B is sized to have sufficient exposure of the output roller 56, though concealing a remainder of the output roller 56 for safety reasons.

Consequently, the articulated motor support defined by the components may include the frame connector 30 configured to be secured to the frame 12 of the wheelchair 10. The positioning arm 40 is operatively connected to the frame connector 30 by at least one lockable joint. The lockable joint may include one or more DOFs, such as a translation and/or a rotation. The motor block 50 is operatively connected to the positioning arm 40 by at least one other lockable joint. The other lockable joint may include one or more DOFs, such as a translation and/or a rotation. The motor block 50 may include, among other components, a motor and an output roller operatively coupled to the motor and configured to contact the wheel 11 of the wheelchair 10 to impart torque to the wheel 11. The positioning arm 40 and the motor block 50 collaborate to provide the motor block 50 with an engaged configuration in which the motor block 50 is configured to contact a wheel of the wheelchair 10 and a disengaged configuration in which the motor block 50 is separated from the wheel 11 of the wheelchair 10.

The articulated motor support for the motorization device 20 enables various DOFs of adjustment to ensure appropriate contact between the output roller 56 and the wheel 11. The various DOFs may be locked, for the articulated motor support to be rigid. For example, the frame connector 30 on the frame 12 may provide one rotational DOF and one translational DOF; the positioning arm 40 is operatively connected to the frame connector 30 by one rotational DOF and one translational DOF; the motor block 50 is operatively connected to the positioning arm 40 by one rotational DOF, though a translational DOF could be used. The adjustment and locking of the various DOFs may be such that the output roller 56 has a rotational axis parallel to a rotational axis of the wheel 11, if desired. In an embodiment, all DOFs are locked, but the engagement and disengagement of the motor bock 50 is achieved by an indexing, via a single-hand press on a detent and manual rotation of the motor block 50.

Figure 14:
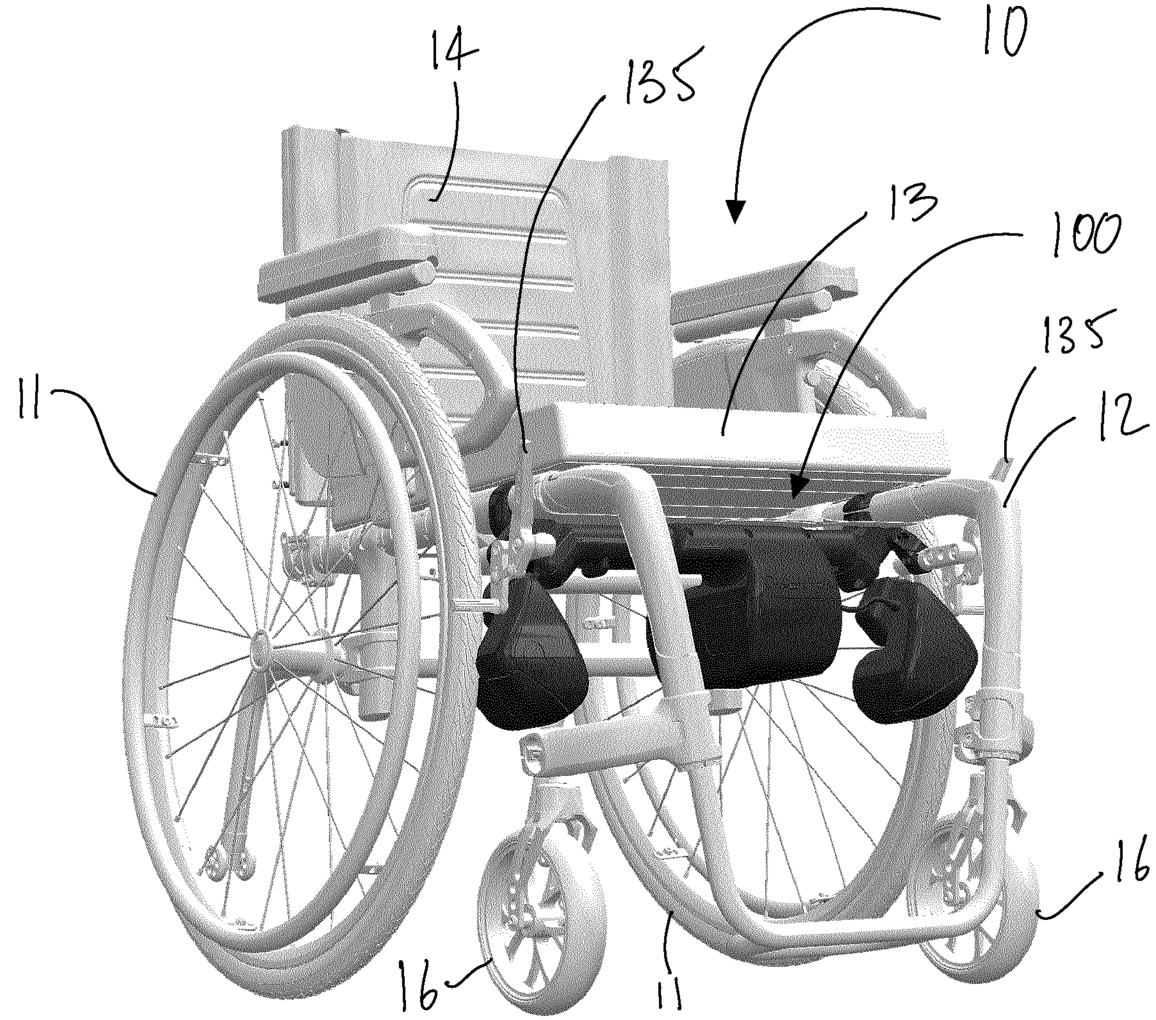
FIG. 14 is a perspective view of a wheelchair featuring a motorization apparatus in accordance with another aspect of the present disclosure.
Figure 15:
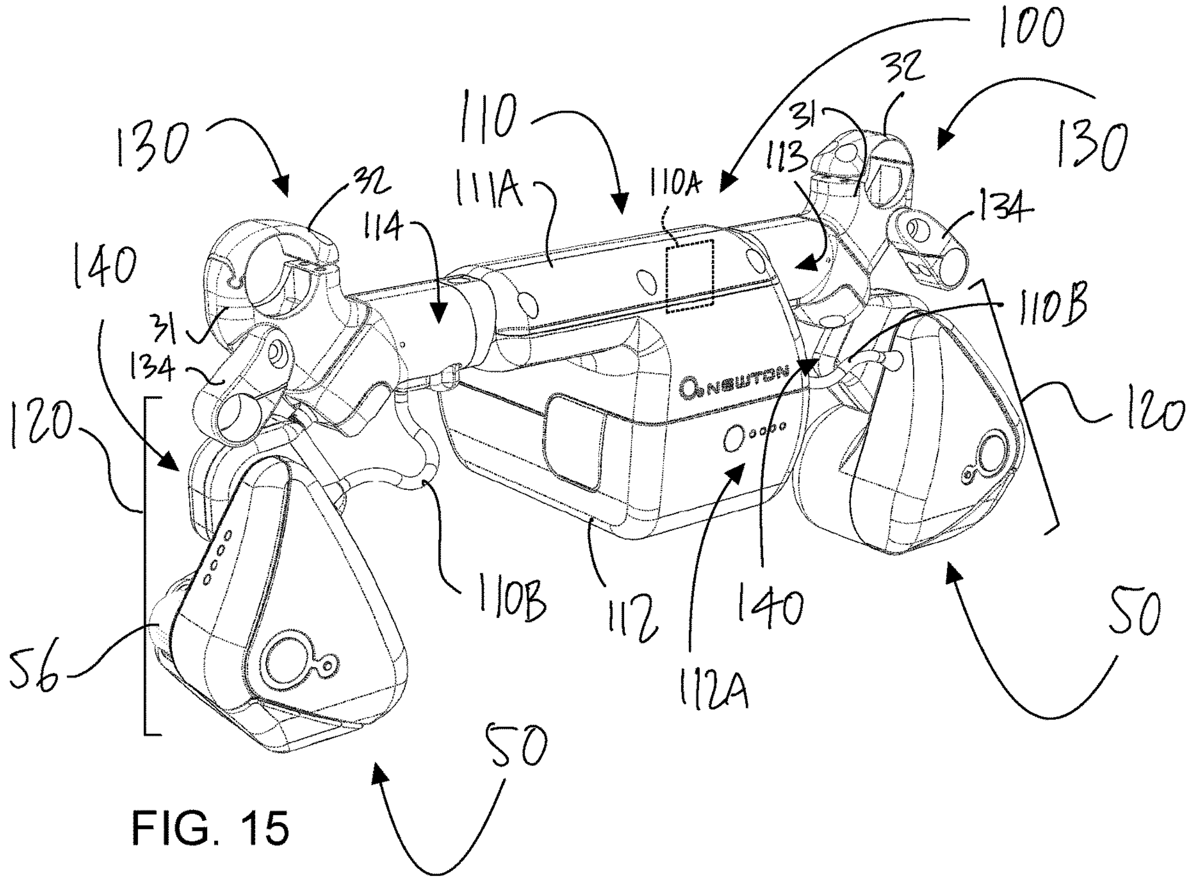
FIG. 15 is a perspective view of the motorization apparatus of FIG. 14.
Figure 16:
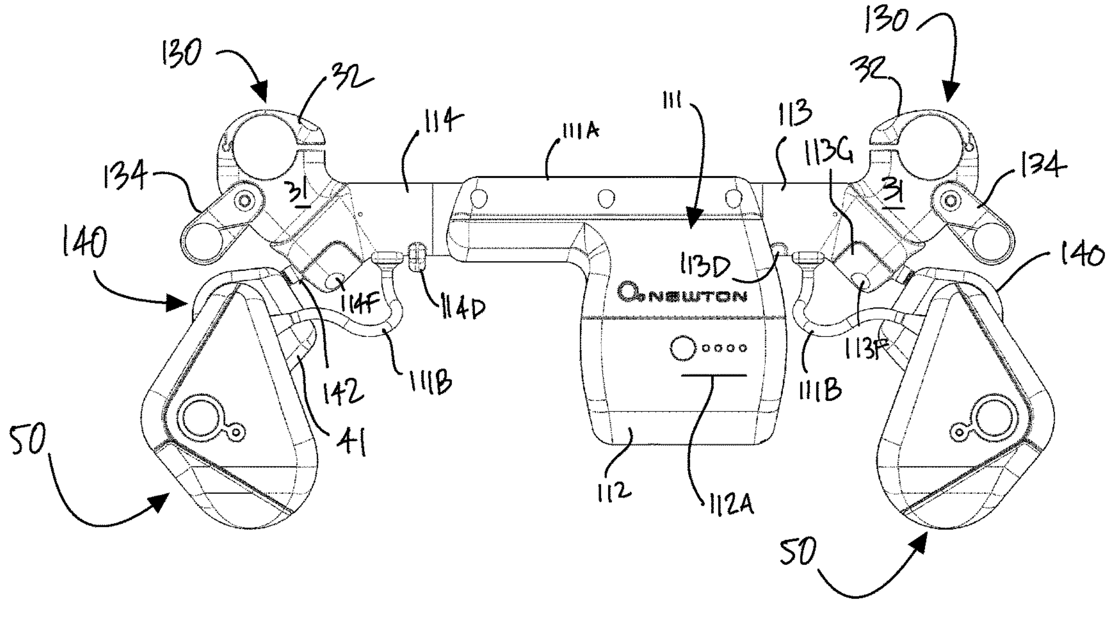
FIG. 16 is a front view of the motorization apparatus of FIG. 14.

Referring to FIGS. 14 and 15, another aspect of the present disclosure shows a motorization apparatus 100. The motorization apparatus 100 is shown in FIG. 14 relative to a wheelchair 10, the wheelchair 10 being similar in configuration to the wheelchair 10 of FIGS. 1 and 2, whereby like reference numerals will be used to identify like components. In fact, the motorization apparatus 100 has numerous components in common with the motorization devices 20, whereby like reference numerals will be used to identify like components. For example, the motor blocks 50 may essentially be the same in the motorization devices 20 as in the motorization apparatus 100.

Figure 17A:
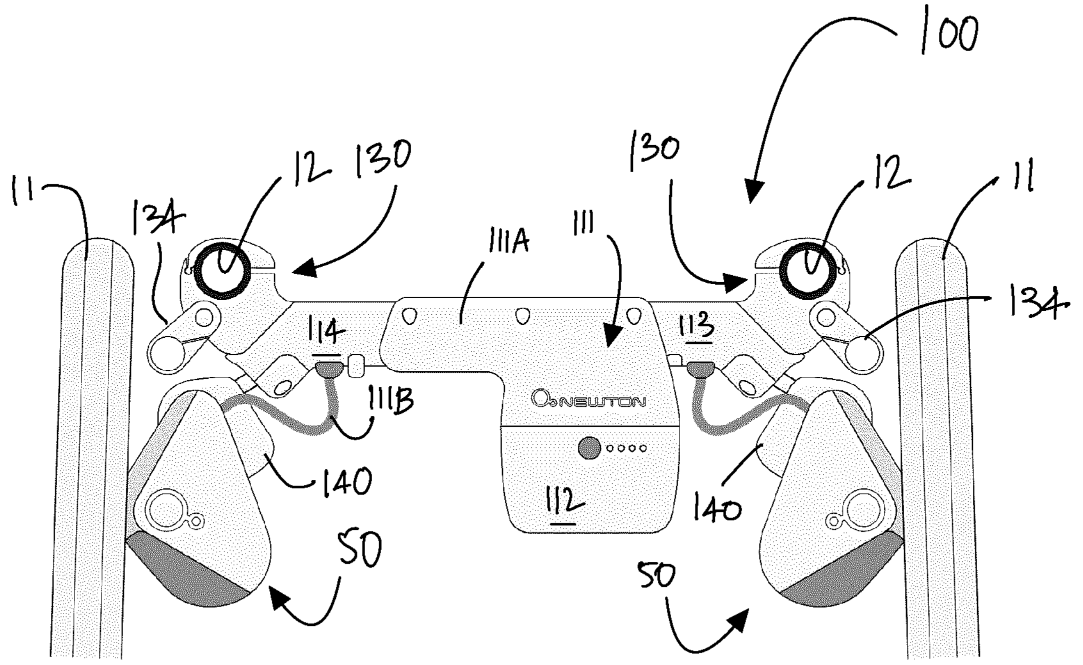
FIG. 17A is a view depicting the motorization devices of the motorization apparatus of FIG. 14 in an engaged configuration.
Figure 17B:
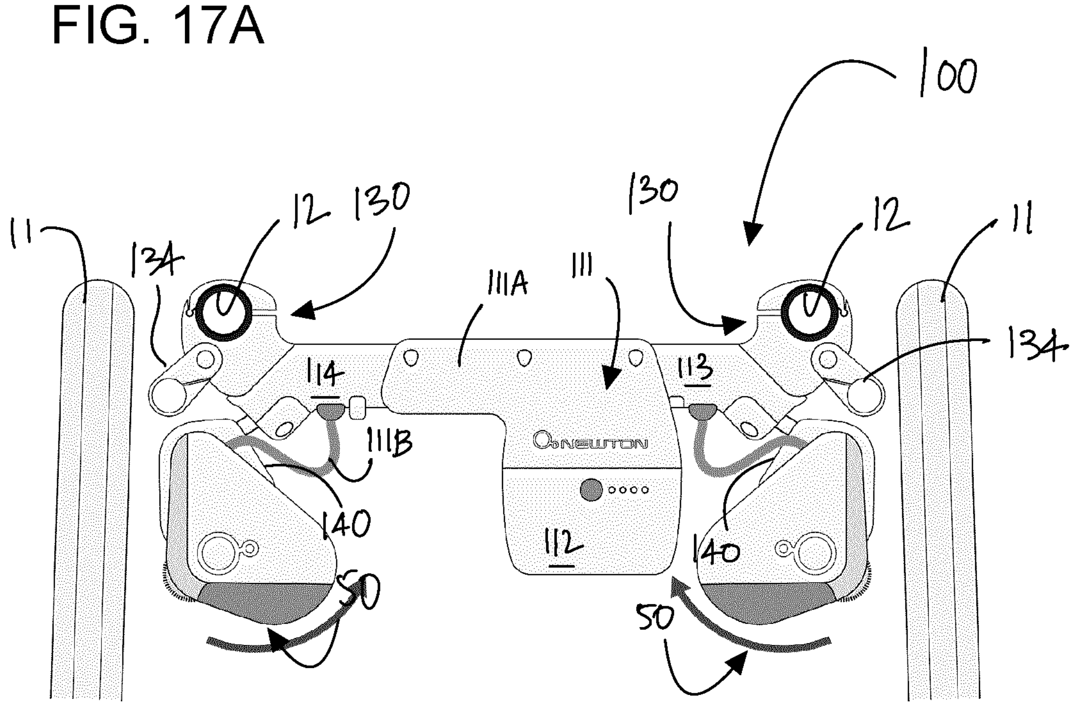
FIG. 17B is a view depicting the motorization devices of the motorization apparatus of FIG. 14 in a disengaged configuration.

The motorization apparatus 100 has a bridge assembly 110 at the ends of which are connected motorization devices 120 (two shown, more may be present, e.g., two motorization devices 120 per wheel 11). The motorization apparatus 100 and each motorization device 120 form an articulated motor support by which the motorization devices 120 may achieve the engaged configuration and the disengaged configuration with the respective wheels 11. In similar fashion to the motorization devices 20, the motorization devices 120 are configured to be displaced between an engaged configuration with the wheel 11, as shown in FIG. 17A, and a disengaged configuration with the wheel 11, as shown in FIG. 17B. In the engaged configuration, both the motorization devices 120 drive the wheels 11, while in the disengaged configuration, the motorization devices 120 do not contact the wheel 11. The motorization devices 120 may be in opposite configurations concurrently, i.e., one engaged and one disengaged. The motorization devices 120 are configured to impart a driving torque to the wheel 11 by being in contact with a tire or tyre of the wheel 11. The motorization devices 120 could alternatively come into engagement contact with a rim of the wheel 11, for example. The motorization device(s) 120 may impart a driving torque concurrently with a driving torque being applied by a user of the wheelchair 10.

The articular motor support may have three or more serially interconnected links, namely the bridge assembly 110 (e.g., acting as a base), frame connectors 130, positioning arms 140 and motor blocks 150. While the monikers do not refer to "links", the frame connectors 130, the positioning arms 140 and the motor blocks 50 are rigid components interconnected by joints, and may hence be said to be links in the mechanism sense.

The motorization devices 120 may essentially be mirror-images of one another (though this is optional), depending on the side of the wheelchair 10 to which they will be mounted. In an embodiment, the motorization apparatus 100 can be removed from the wheelchair 10. FIGS. 20A-20F show a removal of the motorization apparatus 100 from the wheelchair 10, with the frame connectors 130 remaining optionally connected to the wheelchair 10 to facilitate the reinstallation of the motorization apparatus 100 to the wheelchair 10. As observed from FIGS. 20A-20F, the removed portion of the motorization apparatus 100 is removed as a block, i.e., as a single assembly. This is optional.

The bridge assembly 110 may be a structural component in that it interconnects the motorization devices 120. The bridge assembly 110 may also include a controller unit 110A to operate the motorization devices 120, as well as a power source. Wires 1108 may also optionally be external, though internal routing is also possible, for connecting the controller unit 110A to the motorization devices 20.

The frame connectors 130 interface the motorization devices 120 to the frame 12. The frame connector 130 may each form a cylindrical joint with the frame 12, with rotation possible about axis R1. Other types of joints are possible, such as a sliding joint (i.e., translation only), or the frame connector 130 may be secured to the frame without a possibility of adjustment, in a variant. Axis R1 may be coincident with a central axis of the tubular member of the frame 12, to which the frame connector 130 is connected. The frame connector 130 may translate in a direction parallel to axis R1.

The positioning arms 140 are rotatably connected to the bridge assembly 110, and provide scope of movement to the motorization devices 120, i.e., between the engaged configuration and the disengaged configuration. The positioning arms 140 may also be tasked with ensuring that the motor blocks 50 are tensioned, i.e., pressed against the respective wheels 11 in the engaged configuration. The positioning arms 40 are rotatably connected to the bridge assembly 110. As shown in FIG. 20F, the bridge assembly 110, the positioning arms 140 and motor blocks 50 may be detached from the frame connectors 130.

The motor block 50, similar to the embodiment shown in FIGS. 1-13, houses the motor and comes into contact with the wheel 11 to impart the driving torque. Moreover, the motor blocks 50 may be biased against the wheels 11 by the positioning arms 140. For example, a camming mechanism could be present, such as the one shown and explained with the indexing arm 43 and the indexing member 52, or any other camming mechanism, or biasing mechanism. The positioning arms 140 and the motor blocks 50 may be pivotally connected at axis R3. The driving torque is about axis R4. More than one rotational degree of freedom may be present between the positioning arms 140 and the motor blocks 50.

Referring to FIG. 15, the motorization apparatus 100 may include a main body 111, with a tunnel portion 111A. The main body 111 may house the controller unit 110A. The controller unit 110A may include one or more processors, all necessary electronic components for operation of the motorization apparatus 100 (e.g., PCB, chips, wires, etc), and non-transitory computer-readable memory communicatively coupled to the processing unit and having computer-readable program instructions executable by the processing unit for operating the motorization apparatus 100 in providing propulsion assistance to the wheelchair 10. For example, the actions may include synchronizing the propulsion assistance.

A battery 112 may be releasably connected to the main body 111, so as to be removed when required. For example, the battery 112 may be removed fora replacement battery to be installed. The battery 112 may also be removed from the main body 111 to be recharged. In a variant, it is contemplated to enable wired recharge, by providing a port on the battery 112 for wired connection to a power source (e.g., grid). In a variant, charge level indicator(s) 112A may be on the battery 112. The charge level indicator(s) 112A may for example by LED(s), a screen, etc. The charge level indicator(s) 112A may also be on the main body 111, or on other parts of the motorization apparatus 100, or charge level may be accessed through a smart device (e.g., smart phone, tablet) with an application related to the motorization apparatus 100.

A first arm 113 may project from the tunnel portion 111A, in a lateral direction of the wheelchair 10. The first arm 113 may be a spring-loaded arm, for instance by the presence of a spring 113A (FIG. 20C), or like biasing device, biasing the first arm 113 outwardly relative to the tunnel portion 111A, i.e., toward the right of the page in FIG. 15 and FIGS. 20A-20F. The first arm 113 may further include a finger 113B or like engagement means (hook, pin, block, etc), a locking arm 113C and a detent 113D. Moreover, the first arm 113 may have a socket 113E, set screws 113F and a faceplate 113G. These components may also be present in second arm 114, whereby an explanation of the use of such components will be made concurrently below for first arm 113 and the second arm 114.

The second arm 114 also projects laterally from the tunnel portion 111A. In an embodiment, the second arm 114 is telescopically connected to the tunnel portion 111A, so as to be adjustable in position relation to the tunnel portion 111A. Once a desired position is reached, the second arm 114 may be set in position relative to the tunnel portion 111A, e.g., with set screws, pins, or any other mechanism. In an embodiment, no movement is possible, as the motorization apparatus 100 may come in a set length, or as the motorization apparatus 100 may rely on the movement of the first arm 113 to adjust its size to a spacing between tubes of the frame 12. As another variant, the second arm 114 may be spring loaded to be biased outwardly (to the left of the page), in similar fashion to the first arm 113.

Figure 18:
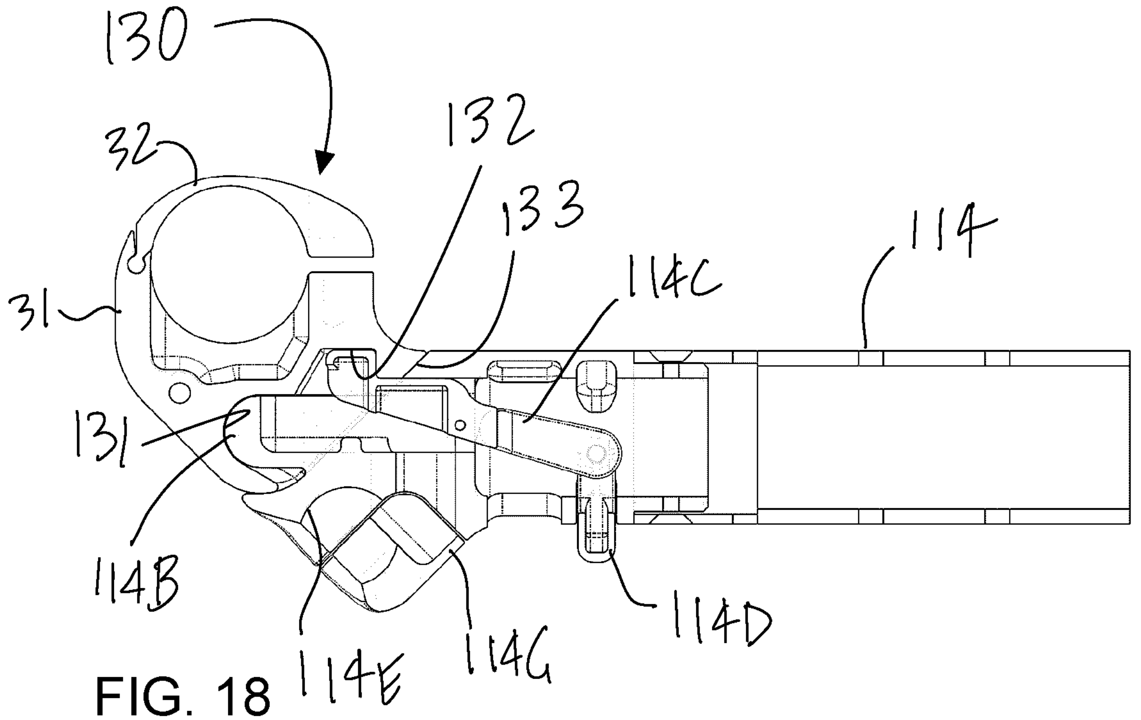
FIG. 18 is a cross-sectional view of a bridge assembly engaged with a frame connector in the motorization apparatus of FIG. 14.
Figure 19:
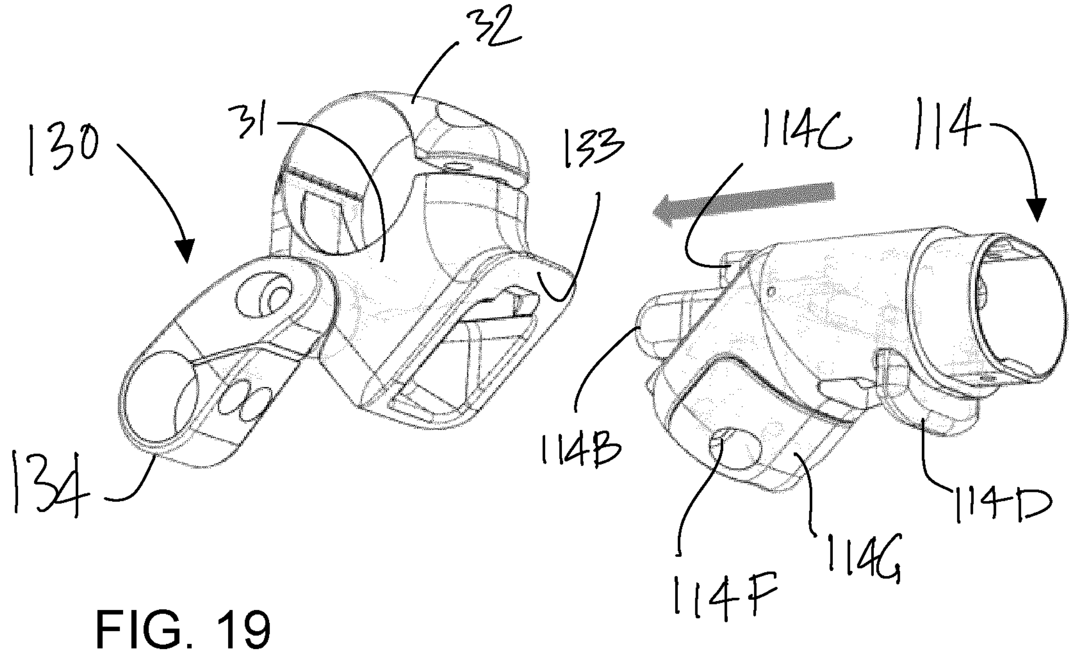
FIG. 19 is a perspective view of the bridge assembly moving toward engagement with the frame connector in the motorization apparatus of FIG. 14.

The second arm 114 may further include a finger 114B or like engagement means (hook, pin, block, etc), a locking arm 114C and a detent 114D. Moreover, the second arm 114 may have a socket 114E, set screws 114F and a faceplate 114G. Referring to FIGS. 18 and 19, the end of the second arm 114 is shown in relation to the frame connector 130. In an embodiment, the first arm 113 connects to its respective frame connector 130 in similar fashion. However, to avoid a duplication of explanation, only the connection of the second arm 114 with the frame connector 130 is provided, with the same approach used for the first arm 113. Mirror images of FIGS. 18 and 19 would illustrate the connection of the first arm 113 relative to its respective frame connector 130.

The second arm 114 is releasably connected to the frame connector 130 as illustrated in FIGS. 18 and 19. The frame connector 130 has a tube clamp as observed, and as described for the frame connectors 30 (FIGS. 1-13). The frame connector 130 may be a socket-like component, for receiving the finger 1148 located at the end of the second arm 114, for engagement in a hook portion 131 of the frame connector 130. The complementary shapes between the finger 114B and the hook portion 131 are such that the second arm 114 may be at a fixed height, but could also pivot out of engagement.

The locking arm 114C is pivotally mounted to a body of the second arm 114, and can be moved by the detent 114D from its catch position (FIG. 18) to a release position. In the catch position, a free end of the locking arm 114C is engaged in catch portion 132 of the frame connector 130, holding the second arm 114 engaged in the frame connector 130. A press on the detent 114D may release the free end of the locking arm 114C from engagement with the frame connector 130 in the catch position. In an embodiment, the detent 114D biases the locking arm 114C to the engagement of FIG. 18. Other locking mechanisms could be used as well, including using fasteners, magnets, spring pins. In a variant, the shown embodiment can be said to be quick-release, in that a single press on the detent 114D may suffice in disengaging the second arm 114 from the frame connector 130.

The frame connector 130 may further include a ramp surface 133, such that when the free end of the locking arm 114C comes into contact with the ramp surface 133, it pivots downwardly to enable its automatic engagement into the catch portion 132 (and concurrent engagement of the finger 114B in the hook portion 131). Again, a similar sequence may be used for engagement/disengagement of the first arm 113 in its respective frame connector 130.

Optionally, a brake support clamp 134 may be provided, with a tightenable clamp and pivot adjustment, to receive a wheel brake lever 135. The brake lever 135 may be seen in FIG. 14. The brake lever 135 is one of other possible braking interfaces, and is merely shown as a non-limitative example.

Figure 21:
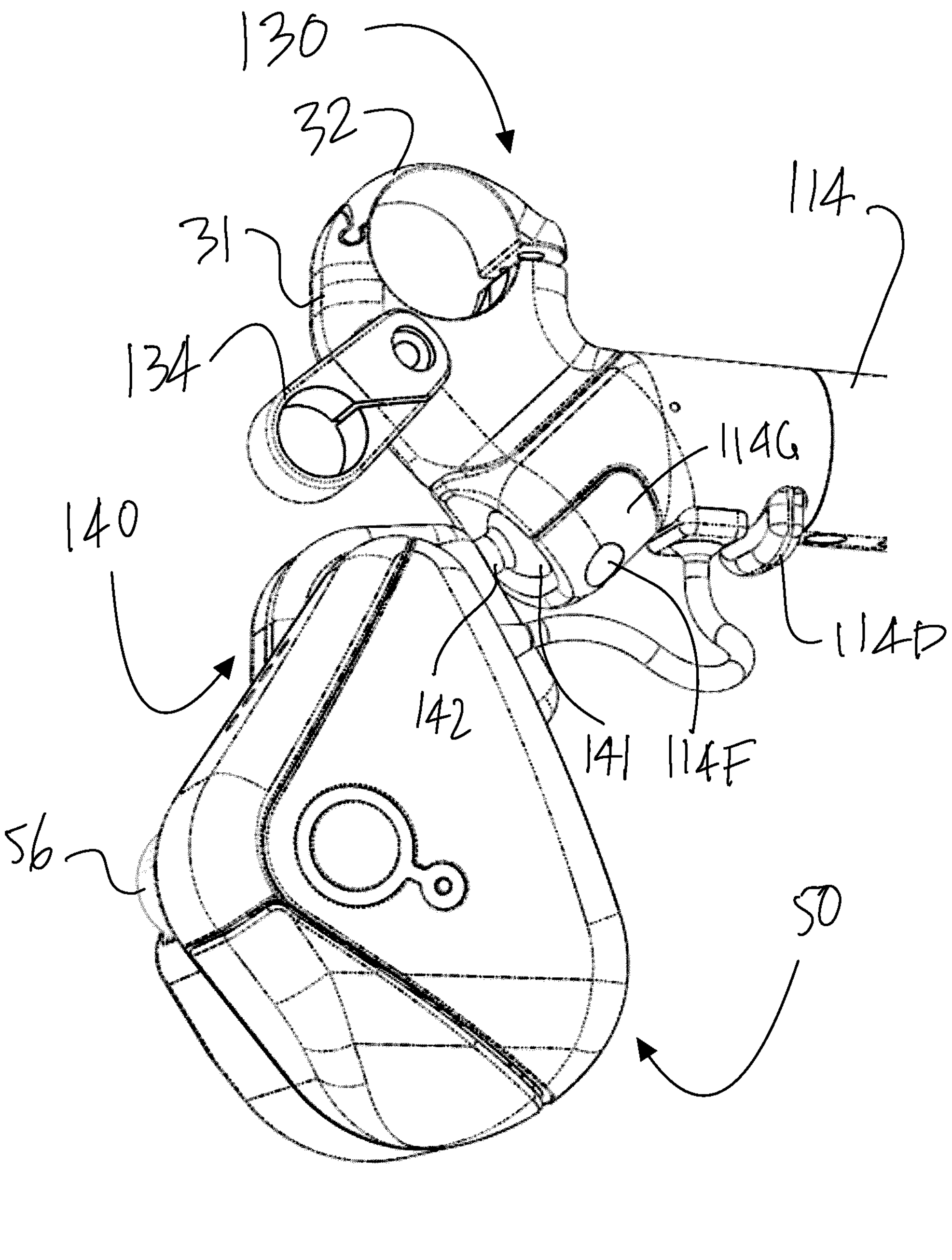
FIG. 21 is a perspective view of a motorization device of the motorization apparatus of FIG. 14.

Referring concurrently to FIGS. 15, 18 and 21, the sockets 113E and 114E are ball joint sockets configured to receive balls 141 of the positioning arms 140. The balls 141 are at the ends of necks 142. The neck project from the body 41 of the positioning arm 140. The positioning arms 140 may be generally similar to the positioning arms 40 (FIGS. 1-13), though the with balls 141 and necks 142 as alternatives to the pivot joint assembly shown in FIG. 6. Accordingly, at least one additional DOF may be present between the positioning arm 140 and the bridge assembly 110, than between the positioning arm 40 and the frame connector 30 (FIGS. 1-13). It is however contemplated to have a pivot assembly similar to that shown in FIG. 6 instead of the ball joint illustrated. Stated differently, a single rotational DOF joint could be used instead of the at least two rotational DOF joint. Moreover, the ball and neck could project from the first arm 113 and second arm 114 of the bridge assembly 110, with a socket being in the positioning arms 140. Set screws 114F could be used to lock the ball joint once a desired orientation of the positioning arm 140 is attained, relative to the bridge assembly 110, by forcing the faceplate 114G against the ball of the ball joint.

The correlation between the positioning arms 140 and the motor blocks 50 are similar to that described for FIGS. 1-13, such that the motor blocks 50 may be selective moved into the engaged configuration (FIG. 17A) and disengaged configuration (FIG. 17B). This may be done with the indexing arm 43, or any equivalent mechanism.

Figure 20A:
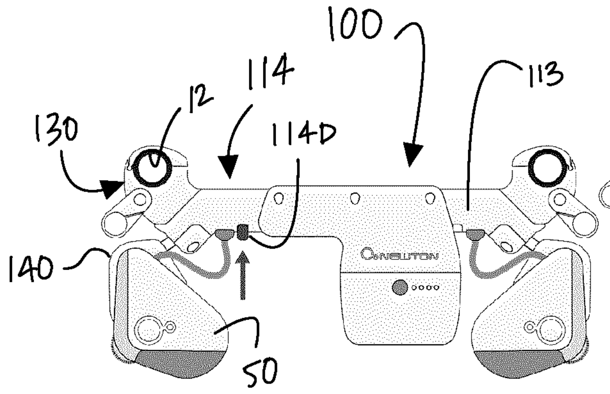
FIGS. 20A-20F demonstrate a sequence of removal of a portion of the motorization apparatus of FIG. 14 from the wheelchair.
Figure 20D:
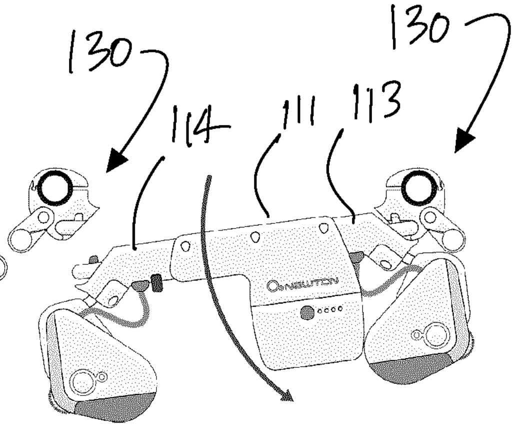
Figure 20B:
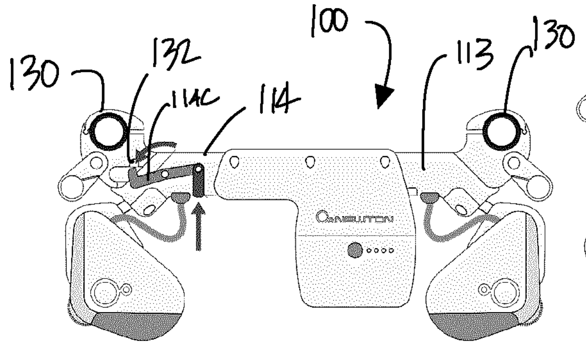
Figure 20E:
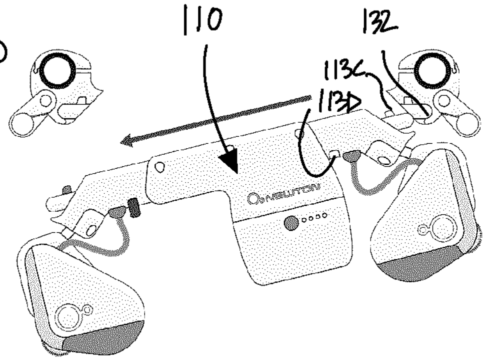
Figure 20C:
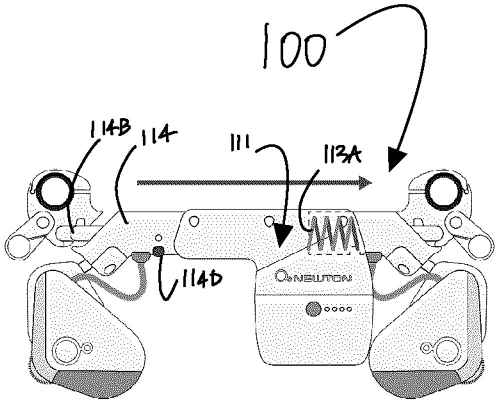
Figure 20F:
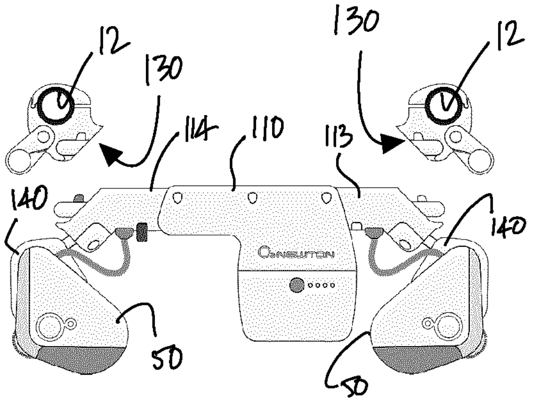

Referring to FIGS. 20A-20F, a sequence of steps to remove the motorization apparatus 100 from the wheelchair 10 is depicted, according to which the frame connectors 130 remain on the wheelchair 10. The sequence of steps makes use of the translational joint in the bridge assembly 100, i.e., the translation of the first arm 113 in the main body 111, that may or may not be spring-biased (e.g., the spring 113A could be replaced by set screws for example). In FIG. 20A, the detent 114D of the second arm 114 is pressed, for the locking arm 114C to disengage from the catch portion 132, as in FIGS. 18 and 20B. With this disengagement, the main body 111 and the second arm 114 may be displaced laterally, against the action of the spring 113A (FIG. 20C). As a result, the second arm 114 separates from its frame connector 130. The bridge assembly 110 may be pivoted relative to the frame connector 130 on the side of the first arm 113. The play between the finger 113B and the hook portion 131 (FIG. 18, showing the finger 114B and the hook portion 141) enables this rotational movement. This rotational movement may cause a disengagement of the free end of the locking arm 113C with the catch portion 132. Alternatively, the detent 113D could be pressed so as not to do the pivoting movement of FIGS. 20D and 20E. Hence, as shown in FIG. 20F, part of the motorization apparatus 100 is removed from the wheelchair 10.

The invention claimed is:

1. A motorization device for a wheelchair comprising
 a positioning arm adapted to be connected to a frame of the wheelchair by a spherical joint, and
 a motor block operatively connected to the positioning arm by at least one other lockable joint, the motor block including at least a motor and an output roller operatively coupled to the motor, the output roller configured to contact a wheel of the wheelchair to impart torque to the wheel, wherein the positioning arm and the motor block collaborate to provide the motor block with an engaged configuration in which the motor block is configured to biasingly contact a wheel of the wheelchair, and a disengaged configuration in which the motor block is separated from the wheel of the wheelchair.

2. A motorization apparatus for a wheelchair comprising a bridge assembly adapted to be connected to opposite sides of a frame of the wheelchair;

at least a pair of motorization devices, each of the motorization devices including:

a positioning arm adapted to be connected to the bridge assembly by at least one lockable joint, and a motor block operatively connected to the positioning arm by at least one other lockable joint, the motor block including at least a motor and an output roller operatively coupled to the motor, the output roller configured to contact a wheel of the wheelchair to impart torque to the wheel, wherein the bridge assembly is configured to interface the pair of motorization devices to the frame of the wheelchair, the bridge assembly being common to and shared by the pair of motorization devices; and wherein the positioning arm and the motor block collaborate to provide the motor block with an engaged configuration in which the motor block is configured to contact a wheel of the wheelchair, and a disengaged configuration in which the motor block is separated from the wheel of the wheelchair.

3. The motorization apparatus according to claim 2, wherein the output roller has surface features thereon so as to be configured to contact a tire of the wheel.

4. The motorization apparatus according to claim 2, wherein the at least one other lockable joint is a pivot joint.

5. The motorization apparatus according to claim 4, wherein an axis of rotation of the output roller is parallel to an axis of the pivot joint.

6. The motorization apparatus according to claim 4, wherein an indexing mechanism is provided between the positioning arm and the motor block for indexing the motor block between the engaged configuration and the disengaged configuration.

7. The motorization apparatus according to claim 6, wherein the indexing mechanism has an indexing arm and an indexing member.

8. The motorization apparatus according to claim 7, wherein the indexing arm is pivotally connected to the positioning arm and the indexing member is fixed to the motor block.

9. The motorization apparatus according to claim 8, wherein the indexing arm is spring-biased into engagement with the indexing member.

10. The motorization apparatus according to claim 9, wherein the indexing arm has a cam end pressing against a surface of the indexing member in the engaged configuration such that the indexing arm biases the motor block for contact against the wheel.

11. The motorization apparatus according to claim 2, wherein the motor block includes a transmission between the motor and the output roller.

12. The motorization apparatus according to claim 2, wherein the lockable joint is a spherical joint.

13. The motorization apparatus according to claim 2, including frame connectors configured to be secured to a frame of the wheelchair, the bridge assembly connected at its ends to one of the frame connectors.

14. The motorization apparatus according to claim 13, wherein each of the frame connectors includes a tube clamp for being clamped to the frame of the wheelchair.

15. The motorization apparatus according to claim 13, wherein at least one of the frame connectors has a brake lever mount.

16. The motorization apparatus according to claim 13, wherein the bridge assembly includes a translational joint for releasable engagement with the frame connectors.

17. The motorization apparatus according to claim 16, wherein the translational joint biases an arm of the bridge assembly into engagement with a respective one of the frame connectors.

18. The motorization apparatus according to claim 13, wherein a detent mechanism between the bridge assembly and the frame connectors for releasing an engagement of the bridge assembly with the frame connectors.

19. The motorization apparatus according to claim 13, including a controller unit in the bridge assembly, the controller unit for controlling the motors of the motor blocks.

20. The motorization apparatus according to claim 2, including a biasing mechanism between the positioning arm and the motor block in at least one of the motorization devise, to bias the motor block into contact with the wheel.

* * * * *